United States Patent
Li

(10) Patent No.: US 11,102,460 B2
(45) Date of Patent: Aug. 24, 2021

(54) IMAGE PROCESSING APPARATUS, DISPLAY APPARATUS, AND IMAGE PROCESSING AND DISPLAY APPARATUS AND METHOD

(71) Applicant: APPOTRONICS CORPORATION LIMITED, Guangdong (CN)

(72) Inventor: Yi Li, Shenzhen (CN)

(73) Assignee: Appotronics Corporation Limited, Guangdong (CN)

( * ) Notice: Subject to any disclaimer, the term of this patent is extended or adjusted under 35 U.S.C. 154(b) by 0 days.

(21) Appl. No.: 16/641,984

(22) PCT Filed: Dec. 6, 2017

(86) PCT No.: PCT/CN2017/114724
§ 371 (c)(1),
(2) Date: May 5, 2020

(87) PCT Pub. No.: WO2019/041620
PCT Pub. Date: Mar. 7, 2019

(65) Prior Publication Data
US 2020/0275068 A1    Aug. 27, 2020

(30) Foreign Application Priority Data
Aug. 30, 2017    (CN) .......................... 201710763670.2

(51) Int. Cl.
*H04N 9/31*    (2006.01)
*G09G 3/34*    (2006.01)

(52) U.S. Cl.
CPC ......... *H04N 9/3182* (2013.01); *G09G 3/3406* (2013.01); *G09G 2360/16* (2013.01)

(58) Field of Classification Search
CPC .......................... H04N 9/3182; G09G 3/3406
See application file for complete search history.

(56) References Cited

U.S. PATENT DOCUMENTS

2005/0055727 A1*    3/2005    Creamer .............. H04N 19/164
                                                          725/105
2005/0068503 A1*    3/2005    Imade ................ G03B 21/2033
                                                          353/31
(Continued)

FOREIGN PATENT DOCUMENTS

CN    101075420 A    11/2007
CN    101282416 A    10/2008
(Continued)

OTHER PUBLICATIONS

International Search Report in corresponding International Patent Application No. PCT/CN2017/114724 dated May 3, 2018, 5 pages.
(Continued)

*Primary Examiner* — Duane N Taylor, Jr.
(74) *Attorney, Agent, or Firm* — Knobbe, Martens, Olson & Bear, LLP

(57) ABSTRACT

The present disclosure relates to an image processing apparatus, a display apparatus, and an image processing and display apparatus and method. The image processing and display apparatus includes a data acquisition module, a data conversion and storage module, a data analysis module, a light-emitting module, and an image modulation module. The data conversion and storage module stores brightness data of a color of each pixel of an image as N-bit grayscale data based on data of a highest brightness of the color of the image and stores a brightness increase index of the color of the image. The light-emitting module adjusts emitted illumination light of the color based on the brightness increase index, so that the image modulation module modulates the illumination light of the color based on the N-bit grayscale data to modulate a displayed image.

23 Claims, 7 Drawing Sheets

(56) References Cited

U.S. PATENT DOCUMENTS

| | | | |
|---|---|---|---|
| 2006/0268021 A1* | 11/2006 | Lin | G09G 3/3406 345/690 |
| 2008/0191998 A1* | 8/2008 | Kuwabata | G09G 3/3406 345/102 |
| 2009/0059080 A1* | 3/2009 | Chen | H04N 9/73 348/655 |
| 2015/0130827 A1* | 5/2015 | Mizushiro | H04N 9/3182 345/589 |
| 2016/0225344 A1 | 8/2016 | Joo et al. | |

FOREIGN PATENT DOCUMENTS

| | | |
|---|---|---|
| CN | 101600120 A | 12/2009 |
| CN | 106791742 A | 5/2017 |
| JP | 2013-58969 A | 3/2013 |

OTHER PUBLICATIONS

Chinese Office Action issued in application No. 201710763670.2 dated Jan. 5, 2021.

\* cited by examiner

IMAGE PROCESSING APPARATUS, DISPLAY APPARATUS, AND IMAGE PROCESSING AND DISPLAY APPARATUS AND METHOD

CROSS REFERENCE TO RELATED APPLICATIONS

This is a U.S. National Stage Application, filed under 35 U.S.C. 371, of International Patent Application No. PCT/CN2017/114724, filed on Dec. 6, 2017, which claims priority to Chinese patent application No. 201710763670.2 filed on Aug. 30, 2017, contents of both of which are incorporated herein by reference in their entireties

TECHNICAL FIELD

The present disclosure relates to the field of image display technology, and in particular, to an image processing apparatus, a display apparatus, and an image processing and display apparatus and method.

BACKGROUND

An existing display apparatus (such as a projection apparatus and a projection system) generally includes a light source device and a spatial light modulator (such as a LCOS spatial light modulator or a DMD spatial light modulator). The light source device emits light of three colors such as red, green and blue, and the spatial light modulator performs image modulation on light emitted by the light source device based on image data, to generate image light. However, the existing display apparatus may have a relatively low contrast and need to be increased.

SUMMARY

In order to solve the problem of the relatively low contrast occurring in the existing display apparatus, the present disclosure provides an image processing apparatus, a display apparatus, an image processing and display apparatus and an image processing method, a display method, an image processing and display method which have a relatively high contrast.

An image processing apparatus is provided, including:

a data acquisition module configured to acquire brightness data of an image, the brightness data including brightness data of a color of each pixel in the image, which represents an actual brightness of the color of each pixel in the image; and a data conversion and storage module configured to store the brightness data of the color of each pixel in the image as N-bit grayscale data and store a brightness increase index of the color of the image, wherein the brightness increase index of the color of the image indicates a degree of increase in a brightness represented by the N-bit grayscale data of the color of each pixel in the image with respect to the actual brightness of the color of the pixel in the image, wherein the N-bit grayscale data is capable of representing M gray levels, wherein said storing the brightness data of the color of each pixel in the image as N-bit grayscale data and the brightness increase index of the color of the image includes the following process:

acquiring a maximum brightness $C_x$ of the color of each pixel in the image;

determining a brightness interval corresponding to each of the M gray levels and the brightness increase index of the color of the image;

for each pixel, setting, based on the brightness interval to which the brightness data of the color of the pixel belongs, the N-bit grayscale data of the pixel as N-bit grayscale data corresponding to the gray level corresponding to the above brightness interval, and storing the N-bit grayscale data of the pixel; and storing the brightness increase index of the color of the image, wherein said determining the brightness interval corresponding to each of the M gray levels and the brightness increase index of the color of the image includes:

if the maximum brightness $C_x$ is greater than or equal to a preset brightness extreme value $C_{max}$ of the color, associating a highest one of the M gray levels with a range of brightness greater than or equal to the preset brightness extreme value $C_{max}$, dividing a range of brightness from 0 to the preset brightness extreme value $C_{max}$ of the color into M-1 intervals, associating each of the M-1 gray levels below the highest gray level in an ascending order of level with one of M-1 intervals in an ascending order of brightness, and determining the brightness increase index of the color of the image based on the preset brightness extreme value $C_{max}$ of the color;

if the maximum brightness $C_x$ is smaller than the preset brightness extreme value $C_{max}$ of the color, associating the highest one of the M gray levels with a preset brightness $C_y$ of the color, dividing a range of brightness from 0 to the preset brightness $C_y$ of the color into M-1 intervals, associating each of the M-1 gray levels below the highest gray level in an ascending order of level with one of the M-1 intervals in an ascending order of brightness, where $C_x <= C_y < C_{max}$, and determining the brightness increase index of the color of the image based on the preset brightness $C_y$ of the color or based on the preset brightness $C_y$ of the color and the preset brightness extreme value $C_{max}$ of the color.

An image processing method is provided, including following steps:

acquiring brightness data of an image, the brightness data including brightness data of a color of each pixel in the image, which represents an actual brightness of the color of each pixel in the image; and storing the brightness data of the color of each pixel in the image as N-bit grayscale data and store a brightness increase index of the color of the image, wherein the brightness increase index of the color of the image indicates a degree of increase in a brightness represented by the N-bit grayscale data of the color of each pixel in the image with respect to the actual brightness of the color of the pixel in the image, wherein the N-bit grayscale data is capable of representing M gray levels, wherein said storing the brightness data of the color of each pixel in the image as N-bit grayscale data and the brightness increase index of the color of the image includes the following process:

acquiring a maximum brightness $C_x$ of the color of each pixel in the image;

determining a brightness interval corresponding to each of the M gray levels and the brightness increase index of the color of the image;

for each pixel, setting, based on the brightness interval to which the brightness data of the color of the pixel belongs, the N-bit grayscale data of the pixel as N-bit grayscale data corresponding to the gray level corresponding to the above brightness interval, and storing the N-bit grayscale data of the pixel; and storing the brightness increase index of the color of the image, wherein said determining the brightness interval corresponding to each of the M gray levels and the brightness increase index of the color of the image includes:

if the maximum brightness Cx is greater than or equal to a preset brightness extreme value Cmax of the color, associating a highest one of the M gray levels with a range of brightness greater than or equal to the preset brightness extreme value Cmax, dividing a range of brightness from 0 to the preset brightness extreme value Cmax of the color into M-1 intervals, associating each of the M-1 gray levels below the highest gray level in an ascending order of level with one of M-1 intervals in an ascending order of brightness, and determining the brightness increase index of the color of the image based on the preset brightness extreme value Cmax of the color;

if the maximum brightness Cx is smaller than the preset brightness extreme value Cmax of the color, associating the highest one of the M gray levels with a preset brightness Cy of the color, dividing a range of brightness from 0 to the preset brightness Cy of the color into M-1 intervals, associating each of the M-1 gray levels below the highest gray level in an ascending order of level with one of the M-1 intervals in an ascending order of brightness, where Cx<=Cy<Cmax, and determining the brightness increase index of the color of the image based on the preset brightness Cy of the color or based on the preset brightness Cy of the color and the preset brightness extreme value Cmax of the color.

Compared to the related art, in the image processing and the image processing method, based on whether the maximum brightness Cx of the color of each pixel in the image is greater than the preset brightness extreme value Cmax, the brightness data of the color of the image is controlled to store the N-bit grayscale data of the image based on the preset brightness extreme value Cmax or the preset brightness Cy (greater than or equal to the maximum brightness Cx) and to store the brightness increase index of the color. When modulating an image based on the N-bit grayscale data, the illumination light for modulating the image may be controlled to be adapted to the preset brightness extreme value Cmax or the preset brightness Cy based on the brightness increase index, so as to divide a brightness region based on the preset brightness extreme value Cmax or the preset brightness Cy and modulate the illumination light based on the N-bit grayscale data having the M gray levels. As a result, not only brightness information of each sub-frame of image can be accurately restored, but also the brightness represented by the N-bit grayscale data is increased compared to the actual brightness of the color of the image since the N-bit grayscale data of the image is stored based on the preset brightness Cy. In view of this, many darkness details of the image can be exhibited by modulating corresponding illumination light using the N-bit grayscale data which represents the brightness being increased, and thus the image can be more accurately and delicately restored, that is, the contrast and the dynamic range of the displayed image are relatively high. In addition, when the maximum brightness Cx is smaller than the preset brightness extreme value Cmax, since the image of the color can be restored and displayed using all the M gray levels, not only the darkness details of the displayed image are exhibited, but also the degree of delicateness of the displayed image can be increased and the actual brightness of the displayed image can be more accurately restored.

A display apparatus is provided, including:

a data analysis module configured to acquire image data of an image, wherein the image data of the image includes image data of a color and a brightness increase index of the color, the image data of the color includes N-bit grayscale data representing a brightness corresponding to the color of each pixel in the image, and the brightness increase index of the color of the image indicates a degree of increase in the brightness represented by the N-bit grayscale data of the color of each pixel in the image with respect to an actual brightness of the color of the pixel in the image;

a light-emitting module configured to emit illumination light of the color, and further configured to adjust a brightness of the illumination light based on the brightness increase index of the color of the image; and an image modulation module configured to modulate the illumination light of the color based on the N-bit grayscale data of the image data of the color, to generate image light required for displaying the image, wherein when the brightness increase index of the color of the image indicates that the brightness represented by the N-bit grayscale data of the color of each pixel in the image is not increased with respect to the actual brightness of the color of the pixel in the image, the light-emitting module adjusts the brightness of the emitted illumination light of the color to a preset standard brightness Lo of the color based on the brightness increase index of the color, and when the brightness increase index of the color of the image indicates that the brightness represented by the N-bit grayscale data of the color of each pixel in the image is increased with respect to the actual brightness of the color of the pixel in the image, the light-emitting module adjusts the brightness of light of the color in the emitted illumination light to Lt based on the brightness increase index of the color, the brightness Lt being smaller than the preset standard brightness Lo.

A display method is provided, including steps of:

acquiring image data of an image, wherein the image data of the image includes image data of a color and a brightness increase index of the color, the image data of the color includes N-bit grayscale data representing a brightness corresponding to the color of each pixel in the image, and the brightness increase index of the color of the image indicates a degree of increase in the brightness represented by the N-bit grayscale data of the color of each pixel in the image with respect to an actual brightness of the color of the pixel in the image;

providing illumination light of the color, and adjusting a brightness of the illumination light based on the brightness increase index of the color of the image; and modulating the illumination light of the color based on the N-bit grayscale data of the image data of the color, to generate image light required for displaying the image, wherein when the brightness increase index of the color of the image indicates that the brightness represented by the N-bit grayscale data of the color of each pixel in the image is not increased with respect to the actual brightness of the color of the pixel in the image, the light-emitting module adjusts the brightness of the emitted illumination light of the color to a preset standard brightness Lo of the color based on the brightness increase index of the color, and when the brightness increase index of the color of the image indicates that the brightness represented by the N-bit grayscale data of the color of each pixel in the image is increased with respect to the actual brightness of the color of the pixel in the image, the light-emitting module adjusts the brightness of light of the color in the emitted illumination light to Lt based on the brightness increase index of the color, the brightness Lt being smaller than the preset standard brightness Lo.

Compared to the related art, in the display apparatus and the image display method, when an image is modulated based on image data of the image, modulating the brightness of the color in the illumination light based on the brightness increase index of the color of the image data can accurately restore the image. Since when the N-bit grayscale data of the color of the image data of the image is increased compared to the actual brightness, many darkness details of the image can be exhibited by modulating corresponding illumination light using the N-bit grayscale data which represents the brightness being increased, then the image can be more accurately and delicately restored, that is, the contrast and the dynamic range of the displayed image are relatively high. In addition, when the maximum brightness Cx is smaller than the preset brightness extreme value Cmax, since the image of the color can be restored and displayed using all the M gray levels, not only the darkness details of the displayed image are exhibited, but also the degree of delicateness of the displayed image can be increased and the actual brightness of the displayed image can be more accurately restored.

An image processing and display apparatus is provided, including a data acquisition module, a data conversion and storage module, a data analysis module, a light-emitting module and an image modulation module, the data acquisition module is configured to acquire brightness data of an image, wherein the data acquisition module is configured to acquire brightness data of an image, the brightness data including brightness data of a color of each pixel in the image, which represents an actual brightness of the color of each pixel in the image;

the data conversion and storage module is configured to store the brightness data of the color of each pixel in the image as N-bit grayscale data and store a brightness increase index of the color of the image, wherein the brightness increase index of the color of the image indicates a degree of increase in a brightness represented by the N-bit grayscale data of the color of each pixel in the image with respect to the actual brightness of the color of the pixel in the image, the N-bit grayscale data is capable of representing M gray levels, wherein said storing the brightness data of the color of each pixel in the image as N-bit grayscale data and the brightness increase index of the color of the image includes the following process:

acquiring a maximum brightness Cx of the color of each pixel in the image;

determining a brightness interval corresponding to each of the M gray levels and the brightness increase index of the color of the image;

for each pixel, setting, based on the brightness interval to which the brightness data of the color of the pixel belongs, the N-bit grayscale data of the pixel as N-bit grayscale data corresponding to the gray level corresponding to the above brightness interval, and storing the N-bit grayscale data of the pixel; and storing the brightness increase index of the color of the image, wherein said determining the brightness interval corresponding to each of the M gray levels and the brightness increase index of the color of the image includes:

if the maximum brightness Cx is greater than or equal to a preset brightness extreme value Cmax of the color, associating a highest one of the M gray levels with a range of brightness greater than or equal to the preset brightness extreme value Cmax, dividing a range of brightness from 0 to the preset brightness extreme value Cmax of the color into M-1 intervals, associating each of the M-1 gray levels below the highest gray level in an ascending order of level with one of M-1 intervals in an ascending order of brightness, and determining the brightness increase index of the color of the image based on the preset brightness extreme value Cmax of the color;

if the maximum brightness Cx is smaller than the preset brightness extreme value Cmax of the color, associating the highest one of the M gray levels with a preset brightness Cy of the color, dividing a range of brightness from 0 to the preset brightness Cy of the color into M-1 intervals, associating each of the M-1 gray levels below the highest gray level in an ascending order of level with one of the M-1 intervals in an ascending order of brightness, where Cx<=Cy<Cmax, and determining the brightness increase index of the color of the image based on the preset brightness Cy of the color or based on the preset brightness Cy of the color and the preset brightness extreme value Cmax of the color, the data analysis module is configured to acquire the N-bit grayscale data stored by the brightness data of the color of each pixel in the image and the brightness increase index of the color of the image, the light-emitting module is configured to emit illumination light of the color, and the light-emitting module is further configured to adjust the brightness of the illumination light based on the brightness increase index of the color of the image, the image modulation module is configured to modulate the illumination light of the color based on the N-bit grayscale data of the image data of the color, to generate image light required for displaying the image, wherein when the brightness increase index of the color of the image indicates that the brightness represented by the N-bit grayscale data of the color of each pixel in the image is not increased with respect to the actual brightness of the color of the pixel in the image, the light-emitting module adjusts the brightness of the emitted illumination light of the color to a preset standard brightness Lo of the color based on the brightness increase index of the color, and when the brightness increase index of the color of the image indicates that the brightness represented by the N-bit grayscale data of the color of each pixel in the image is increased with respect to the actual brightness of the color of the pixel in the image, the light-emitting module adjusts the brightness of light of the color in the emitted illumination light to Lt based on the brightness increase index of the color, the brightness Lt being smaller than the preset standard brightness Lo.

An image processing and display method is provided, including steps of:

acquiring brightness data of an image, wherein the brightness data includes brightness data of a color of each pixel in the image, which represents an actual brightness of the color of each pixel in the image;

storing the brightness data of the color of each pixel in the image as N-bit grayscale data and storing a brightness increase index of the color of the image, wherein the brightness increase index of the color of the image indicates a degree of increase in a brightness represented by the N-bit grayscale data of the color of each pixel in the image with respect to the actual brightness of the color of the pixel in the image, wherein the N-bit grayscale data is capable of representing M gray levels, wherein said storing the brightness data of the color of each pixel in the image as N-bit grayscale data and the brightness increase index of the color of the image includes the following process:

acquiring a maximum brightness Cx of the color of each pixel in the image;

determining a brightness interval corresponding to each of the M gray levels and the brightness increase index of the color of the image;

for each pixel, setting, based on the brightness interval to which the brightness data of the color of the pixel belongs, the N-bit grayscale data of the pixel as N-bit grayscale data corresponding to the gray level corresponding to the above brightness interval, and storing the N-bit grayscale data of the pixel; and storing the brightness increase index of the color of the image, wherein said determining the brightness interval corresponding to each of the M gray levels and the brightness increase index of the color of the image includes:

if the maximum brightness Cx is greater than or equal to a preset brightness extreme value Cmax of the color, associating a highest one of the M gray levels with a range of brightness greater than or equal to the preset brightness extreme value Cmax, dividing a range of brightness from 0 to the preset brightness extreme value Cmax of the color into M-1 intervals, associating each of the M-1 gray levels below the highest gray level in an ascending order of level with one of M-1 intervals in an ascending order of brightness, and determining the brightness increase index of the color of the image based on the preset brightness extreme value Cmax of the color;

if the maximum brightness Cx is smaller than the preset brightness extreme value Cmax of the color, associating the highest one of the M gray levels with a preset brightness Cy of the color, dividing a range of brightness from 0 to the preset brightness Cy of the color into M-1 intervals, associating each of the M-1 gray levels below the highest gray level in an ascending order of level with one of the M-1 intervals in an ascending order of brightness, where Cx<=Cy<Cmax, and determining the brightness increase index of the color of the image based on the preset brightness Cy of the color or based on the preset brightness Cy of the color and the preset brightness extreme value Cmax of the color;

acquiring the N-bit grayscale data stored by the brightness data of the color of each pixel in the image and the brightness increase index of the color of the image;

providing illumination light of the color, and adjusting a brightness of the illumination light based on the brightness increase index of the color of the image; and modulating the illumination light of the color based on the N-bit grayscale data of the image data of the color, to generate image light required for displaying the image, wherein when the brightness increase index of the color of the image indicates that the brightness represented by the N-bit grayscale data of the color of each pixel in the image is not increased with respect to the actual brightness of the color of the pixel in the image, the brightness of the emitted illumination light of the color is adjusted to a preset standard brightness Lo of the color based on the brightness increase index of the color, and when the brightness increase index of the color of the image indicates that the brightness represented by the N-bit grayscale data of the color of each pixel in the image is increased with respect to the actual brightness of the color of the pixel in the image, the brightness of light of the color in the emitted illumination light is adjusted to Lt based on the brightness increase index of the color, the brightness Lt being smaller than the preset standard brightness Lo.

Compared to the related art, in the image processing and display apparatus and the image processing and display method, based on whether the maximum brightness Cx of the color of each pixel in the image is greater than the preset brightness extreme value Cmax, the brightness data of the color of the image is controlled to store the N-bit grayscale data of the image based on the preset brightness extreme value Cmax or the preset brightness Cy (greater than or equal to the maximum brightness Cx) and to store the brightness increase index of the color. When modulating an image based on the N-bit grayscale data, the illumination light for modulating the image may be controlled to be adapted to the preset brightness extreme value Cmax or the preset brightness Cy based on the brightness increase index, so as to divide a brightness region based on the preset brightness extreme value Cmax or the preset brightness Cy and modulate the illumination light based on the N-bit grayscale data having the M gray levels. As a result, not only brightness information of each sub-frame of image can be accurately restored, but also the brightness represented by the N-bit grayscale data is increased compared to the actual brightness of the color of the image since the N-bit grayscale data of the image is stored based on the preset brightness Cy. In view of this, many darkness details of the image can be exhibited by modulating corresponding illumination light using the N-bit grayscale data which represents the brightness being increased, and thus the image can be more accurately and delicately restored, that is, the contrast and the dynamic range of the displayed image are relatively high. In addition, when the maximum brightness Cx is smaller than the preset brightness extreme value Cmax, since the image of the color can be restored and displayed using all the M gray levels, not only the darkness details of the displayed image are exhibited, but also the degree of delicateness of the displayed image can be increased and the actual brightness of the displayed image can be more accurately restored.

SYMBOL DESCRIPTION OF MAIN COMPONENTS

Figure 1:
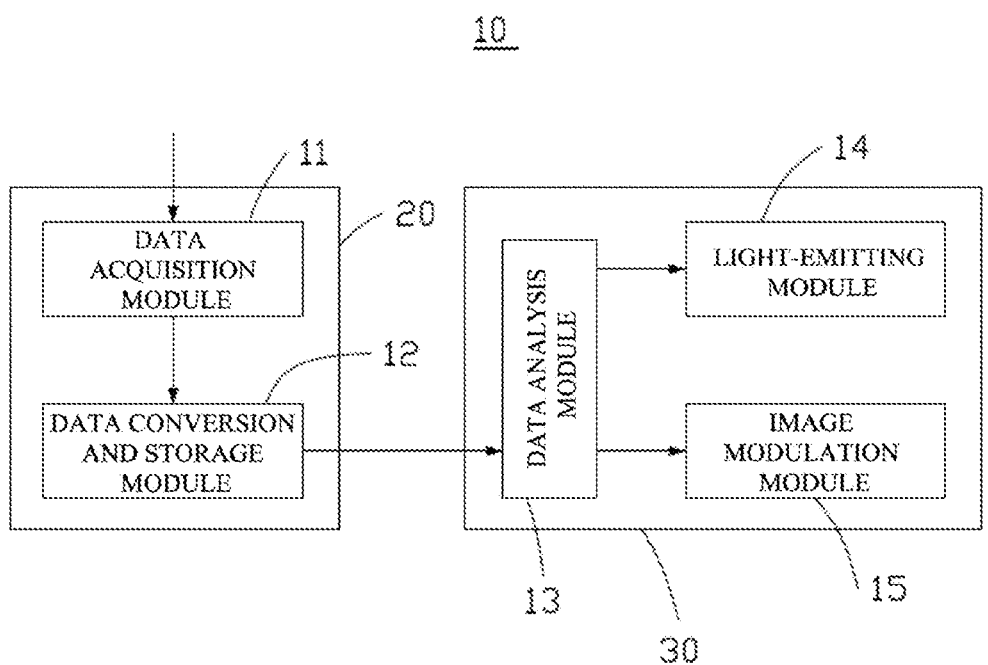
FIG. 1 is a structural schematic diagram of a display apparatus capable of increasing a contrast.

Image processing and display apparatus 10, 40
Data acquisition module 11, 41
Data conversion and storage module 12, 42
Data analysis module 13, 43
Light-emitting module 14, 44
Image modulation module 15, 45
Image processing apparatus 20
Display apparatus 30, 60
Spatial light modulator 151
Light source 141, 144, 145, 146, 441, 461
Color wheel 142, 442, 462
Light source controller 143, 147, 443, 463
Segmented region B, R, G, Y
Scattering-reflecting sheet 464
Light-splitting sheet 465
Light-homogenizing device 466
Supplemental light source 467
Dichroic sheet 468
Steps S1-S4, S21-S24

The following specific embodiments will further explain the present disclosure in conjunction with the above drawings.

DESCRIPTION OF EMBODIMENTS

Generally speaking, human eyes have a wide range of acceptance of brightness. To limits, 0.0001 nits can be perceived for the darkest, and nearly 100,000 nits can be perceived for the brightest. In extremely bright and extremely dark environments, vision of human eyes will decrease. A brightness perception range of human eyes without affecting the vision is about 0.01-1000 nits, and a brightness perception range that human usually sight and adapt in daily life is about 0.0001-10000 nits. Taking the brightness perception range of human eyes that does not affect vision as an example, the brightest signal that human eyes can accept is 100,000 times compared with the darkest signal. However, a grayscale range that can be modulated by an image modulation module composed of a normal monolithic spatial light modulator (such as a DMD) is extremely limited, and if taking a common 8-bit grayscale signal as an example, a grayscale which it can display is only 255 scales, and it is difficult for the contrast to exceed 2000:1. Regardless of the grayscale or the contrast, a range that can be modulated by the image modulation module composed of the normal monolithic spatial light modulator is far below the perception range of human eyes. Human's pursuit on displayed images is to be as close as possible to the perception of human eyes on a natural environment, and the high dynamic light rendering (i.e., HDR) technology is proposed to increase a dynamic range of display apparatuses such as projection apparatuses. There will be two problems that a display grayscale and the contrast of the monolithic spatial light modulator are insufficient, and a grayscale and contrast of a camera device are insufficient.

For any kind of spatial light modulators, when a certain pixel is completely black, it is impossible to output a pixel with zero brightness due to various reasons, so all kinds of spatial light modulators have their own contrast. Being limited to principles of various kinds of spatial light modulators, it is difficult to greatly increase their own display grayscale and contrast, which are far below the dynamic range acceptable to human eyes.

After research, an HDR technology uses a light modulation system composed of a plurality of spatial light modulators to increase the grayscale and contrast of the system, so as to improve the projection effect of the system. Referring to FIG. 1, which is a structural schematic diagram of a display apparatus capable of increasing a contrast, reference numeral 1 refers to a light source, reference numeral 2 refers to a relay system composed of a light-homogenizing relay lens and the like, reference numeral 3 refers to a spatial light modulator (such as DMD or LCOS), reference numeral 4 refers to another relay system, reference numeral 5 refers to a light-splitting system, and reference numeral 6 refers to another spatial light modulator (such as DMD). It can be understood that the spatial light modulators indicated by the reference numerals 3 and 6 can be either of a transmissive type or a reflective type, and in FIG. 1, only one combination is illustrated, while not all combinations are illustrated. In addition, the light-splitting system indicated by the reference numeral 5 may include a TIR prism for the spatial light modulator of the DMD and may include a polarizer for the spatial light modulator of the LCD or the LCOS.

As shown in FIG. 1, if the spatial light modulator 3 has a contrast of M:1 and the spatial light modulator 6 has a contrast of N:1, then the contrast of the entire system is M×N: 1. In this way, even the use of two spatial light modulators can greatly increase the contrast of the display apparatus. If the two spatial light modulators are both of a normal 8-bit grayscale, the system grayscale can reach 16 bits, more than 60,000 scales, and the system grayscale is greatly increased.

However, normal image camera devices (photographic devices such as cameras, video cameras, etc.), especially digital camera devices, do not have grayscales up to 16 bits either. A general method is to take two pictures within a camera time of one frame of the image, including one picture having a long exposure time and containing all highlight details, and the other picture having a short exposure time and containing all dark details. Then, through an image processing technology, two low-bit grayscale images respectively containing the highlight details and the dark details are combined into one high-bit grayscale image containing both the highlight details and the dark details. During the display, information on the displayed image is then distributed to the two spatial light modulators of the display apparatus through an algorithm, to finally display an image having a high dynamic range.

For the same displayed image, although the 16-bit grayscale image has a higher dynamic range than the 8-bit grayscale image, a data amount has also been increased tremendously, and a data amount of an image signal will be tremendously increased, which brings difficulties to transmission and storage of the image information. A common alleviation method is to provide two spatial light modulators, including one with a high resolution and the other one with a low resolution. One pixel on the low-resolution spatial light modulator corresponds to a plurality of pixels on the high-resolution spatial light modulator. In general, since two adjacent pixels rarely present images with a large difference in light and dark, this method can be used to achieve similar effects with the case in which two high-contrast spatial light modulators are used. By reducing the resolution of one spatial light modulator, the data information of the image is reduced, to alleviate a storage and data transmission pressure brought by the image having the high data amount.

It can be seen that although adopting two spatial light modulators and taking two pictures with different exposure time can increase the contrast of the system, an increase in the data amount results in an increase in the storage and data transmission pressure of the camera device and the display apparatus. In view of the above problems, the present disclosure provides a projection system with a primary color adjustable light source HDR technology, and it needs to process the stored image signals when capturing and control the brightness of the illumination light of the modulated image based on the image data when displaying the image, which can not only increase the contrast but also obtain an image with a higher dynamic range and a more delicate display effect.

Specifically, when the illumination light is adjustable, the image data of an image can be analyzed by software to find a brightest point of each sub-frame of image in the image. Generally, the brightest point of most frames of image will not be a brightest value that the display apparatus can emit, meaning that even at the brightest point of each sub-frame of image, the spatial light modulator of the image modulation module still needs to attenuate the incident light source light before emitting it. If the brightness of the illumination light can be adjusted at a high frequency, then for each sub-frame of each image, the light source can actively reduce the brightness to the brightness of the brightest point of each sub-frame of the image, thereby keeping the image unchanged by adjusting a grayscale value of each pixel on the spatial light modulator of the image modulation module. Furthermore, a modulation capability of the spatial light modulator of the image modulation module can be released by dynamically adjusting the brightness of the illumination light of the modulated image.

Specifically, at a capturing end, the camera device is required to dynamically adjust the dynamic range of each frame of the image based on the brightness and darkness of the image, to match the use of the illumination light during display and expand the dynamic range of each frame of the image. That is, in order to further expand the dynamic range of each sub-frame of image, the image data acquired by the camera device also needs to be processed accordingly.

However, in a display apparatus that performs color display, if the illumination light for image modulation is white light so that the illumination light is only adjustable as a whole, then when brightness of a certain primary color (such as blue, red, or green) of a certain pixel in an image (such as one frame of image, which usually includes three sub-frames of image: a blue sub-frame, a red sub-frame, and a green sub-frame) is very high, the illumination light has to maintain a relatively high brightness. A method further provided by the present disclosure is to control a ratio of the three-primary color light of the illumination light to be adjustable at a certain degree, so that when a brightness of a certain primary color of a certain pixel in an image is very high, the illumination light can make the light of this color maintain the relatively high brightness and make light of other colors maintain a relatively low brightness. In this way, an overall brightness of the illumination light can be reduced, but the brightness of a certain kind of primary-color light can be kept very high, thereby increasing the contrast of the image. Combined with the way, in which the camera device performs dynamical adjustment based on brightness and darkness conditions of each primary color of each frame of image when capturing, as well as the use of illumination light having an adjustable primary color during display, the dynamic range of each sub-frame of image can be further expanded. In simple terms, the present disclosure further increases the dynamic range of the displayed image by processing the dynamic range of each sub-frame of image obtained at the capturing end, and in combination with the light source adjustment.

Figure 2:
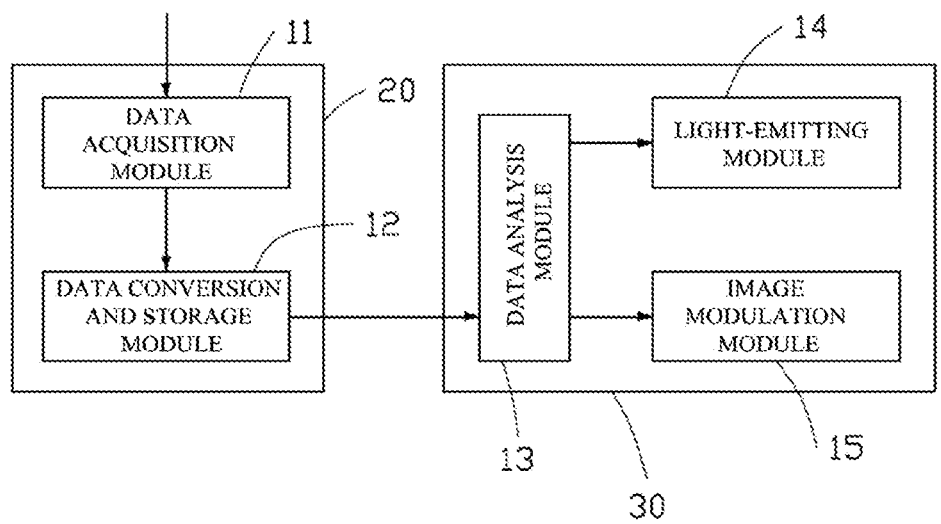
FIG. 2 is a structural schematic block diagram of an image processing and display apparatus according to a first embodiment of the present disclosure.

Referring to FIG. 2, which is a structural schematic block diagram of an image processing and display apparatus 10 according to a first embodiment of the present disclosure, the image processing and display apparatus 10 includes a data acquisition module 11, a data conversion and storage module 12, a data analysis module 13, a light-emitting module 14, and an image modulation module 15.

The data acquisition module 11 is configured to acquire brightness data of an image, the brightness data includes brightness data of one color of each pixel in the image, which represents an actual brightness of the color of each pixel in the image. Specifically, in an embodiment, the data acquisition module 11 may be a brightness sensor of an image camera device (including but not limited to a camera, a video camera, a camera lens, a computer, a mobile phone, etc.), and can be configured to sense a brightness of a target scene captured by the image camera device, so as to obtain the brightness data of the image. After acquiring the brightness data of the image, the data acquisition module 11 transmits the brightness data of the image to the data conversion and storage module 12. In another embodiment, the data acquisition module 11 may receive the brightness data of the image transmitted by an external electronic device.

Further, it can be understood that, in an embodiment, the data acquisition module 11 and the data conversion and storage module 12 may belong to an image processing apparatus 20, but the image processing apparatus 20 may be an image camera device so that the data acquisition module 11 may directly capture a target scene to obtain brightness data of an image. However, it can be understood that the image processing apparatus 20 may be an image processing apparatus capable of performing image processing, for example, a terminal (such as a camera, a video camera, a computer, a mobile phone, etc.), a server, a network platform, and a computer device, and can be configured to receive and process brightness data of an image transmitted by an external device. In particular, in an embodiment, the image processing apparatus 20 may also be a picture processing program that is stored in a memory of a terminal or a network platform, a server or a computer device and is executable on a corresponding processor.

The data analysis module 13, the light-emitting module 14, and the image modulation module 15 may belong to a display apparatus 30. The display apparatus 30 and the image processing apparatus may be independent of each other. The display apparatus 30 may be a display apparatus capable of displaying an image, such as a projection display apparatus or a liquid crystal display apparatus. However, it can be understood that, in another embodiment, the data acquisition module 11, the data conversion and storage module 12, the data analysis module 13, the light-emitting module 14, and the image modulation module 15 may all belong to a device having functions of image capturing, processing and displaying, such as a camera with a display screen, a video camera, a computer with functions of capturing and displaying, and a mobile phone.

The data conversion and storage module 12 is configured to receive the brightness data of the image obtained by the data acquisition module 11, store the brightness data of the color of each pixel in the image as N-bit grayscale data, and also store a brightness increase index of the color of the image. The brightness increase index of the color of the image indicates a degree of increase in the brightness represented by the N-bit grayscale data of the color of each pixel in the image with respect to the actual brightness of the color of each pixel in the image. Generally, a brightness represented by the N-bit grayscale data of the color of any pixel stored by the data conversion and storage module 12 is greater than or equal to the actual brightness of the color of the pixel, that is, the degree of increase of the brightness increase index is at least that the actual brightness is unchanged (that is, there is no increase compared to the actual brightness) or indeed increased compared to the actual brightness. It can be understood that the data conversion and storage module 12 may be integrated in an image camera device or in a display apparatus or stored separately in a device (such as a computer) having an image processing function.

The N-bit grayscale data can represent M gray levels (such as 0 to 255 gray levels, also known as 0 to 255 grayscales, a total of 256 gray levels or 256 grayscales; such as 0 to 7 gray levels, also called 0 to 7 grayscales, a total of 8 gray levels or 8 grayscales), and the data conversion and storage module 12 storing the brightness data of the color of each pixel in the image as the N-bit grayscale data and storing the brightness increase index of the color of the image may include following processes:

acquiring a maximum brightness Cx of the color of each pixel in the image;

determining a brightness interval corresponding to each of the M gray levels and the brightness increase index of the color of the image;

for each pixel, setting, based on the brightness interval to which the brightness data of the color of the pixel belongs, the N-bit grayscale data of the pixel as the N-bit grayscale data corresponding to the gray level corresponding to the brightness interval, and storing the N-bit grayscale data of each pixel; and storing the brightness increase index of the color of the image.

A process of determining, by the data conversion and storage module, the brightness interval corresponding to each of the M gray levels and the brightness increase index of the color of the image includes:

if the maximum brightness Cx is greater than or equal to a preset brightness extreme value Cmax of the color, associating a highest one of the M gray levels with a range of brightness greater than or equal to the preset brightness extreme value Cmax; the data conversion and storage module dividing a range of brightness from 0 to the preset brightness extreme value Cmax of the color into M-1 intervals, associating each of the M-1 gray levels below the highest gray level in an ascending order of level with one of M-1 intervals in an ascending order of brightness, and determining the brightness increase index of the color of the image based on the preset brightness extreme value Cmax of the color;

if the maximum brightness Cx is smaller than the preset brightness extreme value Cmax of the color, associating the highest one of the M gray levels with a preset brightness Cy of the color; dividing a range of brightness from 0 to the preset brightness Cy of the color into M-1 intervals, the data conversion and storage module associating each of the M-1 gray levels below the highest gray level in an ascending order of level with one of the M-1 intervals in an ascending order of brightness, where Cx<=Cy<Cmax, and determining the brightness increase index of the color of the image based on the preset brightness Cy of the color or based on the preset brightness Cy of the color and the preset brightness extreme value Cmax of the color. It can be understood that the preset brightness Cy is a brightness greater than or equal to the maximum brightness Cx. In this embodiment, Cy may be equal to the Cx.

Further, in this embodiment, the data conversion and storage module 12 may evenly divide the range of brightness from 0 to the preset brightness extreme value Cmax of the color into M-1 intervals. Specifically, in this case, the brightness intervals associated with the M gray levels in the ascending order are [0, Cmax*1/M-1), [Cmax*1/M-1, Cmax*2/M-1), [Cmax*2/M-1, Cmax*3/M-1), . . . , [Cmax*(j-1)/M-1, Cmax*j/M-1), . . . , [Cmax*(M-2)/M-1, Cmax), and [Cmax, Cmax], respectively, where j is a natural number greater than or equal to 1 and smaller than or equal to M-1.

Further, the data conversion and storage module 12 may evenly divide the range of brightness from 0 to the preset brightness Cy of the color into M-1 intervals. Specifically, in this case, the brightness intervals associated with the M gray levels in the ascending order are [0, Cy*1/M-1), [Cy*1/M-1, Cy*2/M-1), [Cy*2/M-1, Cy*3/M-1), [Cy*(j-1)/M-1, Cy*j/M-1), . . . , [Cy*(M-2)/M-1, Cy), and [Cy, Cy], respectively.

N may represent a number of bits of the grayscale data, such as 3 bits, 8 bits, etc., and M represents the number of the gray levels that the N-bit grayscale data is capable of representing, where generally, $M=2^N$. For example, it is assumed that N is equal to 3, that is, there is 3-bit binary data, and the number of the gray levels that the 3-bit binary data is capable of representing is 8, i.e., a total of 8 gray levels from 0 to 7. That is, M is equal to 8, and the gray levels from 0 to 7 can be represented by 3-bit binary data are 000,001,010,011,100,101,110, and 111, respectively. It is assumed that N is equal to 8, that is, there is 8-bit binary data, and the number of the gray levels that the 8-bit binary data is capable of representing is 256, i.e., a total of 256 gray levels from 0 to 255. That is, M is equal to 256, and the gray levels from 0 to 255 can be respectively represented by 8-bit binary data, which will not be specifically listed here.

Furthermore, it can be understood that the brightness data of the color of each pixel in the image includes brightness data of at least two colors. The color includes the at least two colors such as two colors of blue and yellow or three colors of blue, red, and green. The data conversion and storage module 12 respectively stores the brightness data of each color of each pixel in the image as N-bit grayscale data and stores the brightness increase index of each color of the image. The N-bit grayscale data stored in the brightness data of each color of each pixel in the image constitutes image data corresponding to the color, and the image data of all colors as stored for the image constitutes data of one frame of image, while the image data of any color stored in the image can be regarded as data of one sub-frame of image, and the data of the one frame of image may include image data of at least two colors and thus include data of at least two subframes of image, such as blue sub-frame image data, red sub-frame image data, and green sub-frame image data.

It can be understood that the data conversion and storage module 12 respectively stores the N-bit grayscale data for the brightness data and the brightness increase index of each color of the image. For example, when the color includes three colors (such as blue, red, and green), the data conversion and storage module 12 stores, one by one, N-bit grayscale data for the brightness data of a first color (such as blue) of each pixel (that is, all pixels) in the image and stores the brightness increase index of the first color (such as blue), the data conversion and storage module 12 also stores, one by one, N-bit grayscale data for the brightness data of a second color (such as red) of each pixel in the image and stores the brightness increase index of the second color (such as red), and the data conversion and storage module 12 also stores, one by one, N-bit grayscale data for the brightness data of a third color (such as green) of each pixel in the image and stores the brightness increase index of the third color (such as green). In addition, as described above, the data conversion and storage module respectively stores the N-bit grayscale data for the brightness data and stores the brightness increase index of each color of the image. It can be understood that the maximum brightness Cx of different colors of each pixel in the image may be different. For example, the maximum brightness of the first color (such as blue) of each pixel in the image may be Cx1, the maximum brightness of the second color (such as red) of each pixel in the image may be Cx2, the maximum brightness of the third color (such as green) of each pixel in the image may be Cx3, and the Cx1, Cx2 and Cx3 may be different. Accordingly, the preset brightness extreme value Cmax and the preset brightness Cy of each color may also be different. For example, the preset brightness extreme value of the first color (such as blue) may be Cmax1, the preset brightness extreme value of the second color (such as red) may be Cmax2, the preset brightness extreme value of the third color (such as green) may be Cmax3, and the Cmax1, Cmax2, and Cmax3 may be different. For example, the preset brightness of the first color (such as blue) may be Cy1, the preset brightness of the second color (such as red) may be Cy2, the preset brightness of the third color (such as green) may be Cy3, and the Cy1, Cy2, and Cy3 may be different. However, generally, the number of bits N of the grayscale data and the number M of the gray levels of each color may be equal. For example, the number of bits of the blue, red, and green grayscale data can all be N, and the number M of the gray levels can all be $2^N$.

In order to facilitate understanding, the case, in which N is 3 and M is 8, is taken as an example to make detailed description on steps, in which the data conversion and storage module 12 stores the brightness data of the color of each pixel in the image as N-bit grayscale data. When M is equal to 8, the M gray levels are respectively 0 to 7, that is, the lowest gray level is 0 and the highest gray level is 7.

Assuming that a preset brightness extreme value of a color (such as the first color) is 1300, for the brightness data of an image acquired by the data acquisition module and output to the data conversion and storage module 12, the data conversion and storage module 12 determines the maximum brightness in the brightness data of the color of each pixel in the image. If the maximum brightness is greater than or equal to the preset brightness extreme value 1300, then the data conversion and storage module 12 stores the brightness data, of which brightness is greater than or equal to the preset brightness extreme value 1300, as the highest gray level (that is, the gray level 7, and its corresponding 3-bit binary data is 111), and a relationship between M-1 (e.g., 7) brightness intervals, which are corresponding to M-1 gray levels (0 to 6) below the highest gray level determined by the data conversion and storage module 12 based on the preset brightness extreme value Cmax (e.g., 1300), and the N-bit grayscale data is as shown in a following table:

TABLE 1

| Brightness Interval | Gray Level | N-bit Binary Data |
|---|---|---|
| [0, 185.714285714285) | 0 | 000 |
| [185.714285714285, 371.428571428571) | 1 | 001 |
| [371.428571428571, 557.142857142857) | 2 | 010 |
| [557.142857142857, 742.857142857143) | 3 | 011 |
| [742.857142857143, 928.571428571429) | 4 | 100 |
| [928.571428571429, 1114.28571428572) | 5 | 101 |
| [1114.28571428572, 1300) | 6 | 110 |

Table 1 is a schematic table illustrating correspondence of the M-1 brightness intervals, the M-1 gray levels, and the N-bit grayscale data when the maximum brightness Cx is greater than or equal to Cmax.

According to Table 1, the data conversion and storage module 12 may set, based on the brightness interval to which the brightness data of the color of each pixel belongs, the N-bit grayscale data of the pixel as the N-bit grayscale data corresponding to the gray level corresponding to the above brightness interval, and store the N-bit grayscale data of the pixel. Specifically, assuming that the brightness data of the color of each pixel in the image is 800, according to the above table, the data conversion and storage module 12 correspondingly stores the brightness data of 800 as the 3-bit binary data 100 corresponding to the gray level 4. According to the above description, the data conversion and storage module 12 may store all the brightness data of the color of the image as N-bit grayscale data. Moreover, the data conversion and storage module 12 also needs to determine and store the brightness increase index of the color of the image. According to the foregoing, since the maximum brightness of the color is greater than or equal to the preset brightness extreme value Cmax, the N-bit grayscale data of the color of each pixel that is below the highest gray level and stored by the data conversion and storage module 12 is unchanged with respect to the actual brightness of the color of the pixel. Therefore, the degree indicated by the brightness increase index stored by the data conversion and storage module 12 at this time is that there is no increase or change with respect to the actual brightness. Specifically, at this time, the brightness increase index may be represented by 0 or 1.

Further, it is assumed that the preset brightness extreme value of the color (such as the first color) is 1300, and as for the brightness data of an image obtained by the data acquisition module 11 and output to the data conversion and storage module 12, the data conversion and storage module 12 determines the maximum brightness in the brightness data of the color of each pixel in the image. If the maximum brightness is smaller than the preset brightness extreme value 1300, for example, the maximum brightness is 800, then the data conversion and storage module 12 stores the brightness data that is equal to 800 as the highest gray level (that is, the gray level is 7, and its corresponding 3-bit binary data is 111), and a relationship between the M-1 (such as 7) brightness intervals, which are corresponding to the M-1 gray levels (0 to 6) below the maximum gray level determined by the data conversion and storage module 12 based on the preset brightness Cy (in this embodiment, Cy=Cx, i.e., 800), and the N-bit grayscale data is as shown in a following table:

TABLE 2

| Brightness Interval | Gray Level | N-bit Binary Data |
|---|---|---|
| [0, 114.285714285714) | 0 | 000 |
| [114.285714285714, 228.571428571428) | 1 | 001 |
| [228.571428571428, 342.857142857142) | 2 | 010 |
| [342.857142857142, 457.142857142856) | 3 | 011 |
| [457.142857142856, 571.42857142857) | 4 | 100 |
| [571.42857142857, 685.714285714284) | 5 | 101 |
| [685.714285714284, 800) | 6 | 110 |

Table 2 is a schematic table illustrating correspondence of the M-1 brightness intervals, the M-1 gray levels, and the N-bit grayscale data when the maximum brightness Cx is smaller than Cmax and Cx=Cy.

According to Table 2, the data conversion and storage module 12 may set, based on the brightness interval to which the brightness data of the color of each pixel belongs, the N-bit grayscale data of each pixel as the N-bit grayscale data corresponding to the gray level corresponding to the above brightness interval, and store the N-bit grayscale data of the pixel. Specifically, it is assumed that the brightness data of the color of each pixel in the image is 500, and according to the above table, the data conversion and storage module 12 stores the brightness data of 500 correspondingly as 3-bit binary data 100 corresponding to the gray level 4. According to the above description, the data conversion and storage module may store all the brightness data of the color of the image as N-bit grayscale data. Moreover, the data conversion and storage module 12 also needs to determine and store the brightness increase index of the color of the image. According to the foregoing, since the maximum brightness Cx of the color is smaller than the preset brightness extreme value Cmax, the N-bit grayscale data of the color of each pixel that is below the highest gray level and stored by the data conversion and storage module 12 is increased with respect to the actual brightness of the color of the pixel. Therefore, the degree indicated by the brightness increase index stored by the data conversion and storage module 12 at this time is that there is surely increase. Specifically, at this time, the brightness increase index may be indicated by (Cy-Cx)/Cx or Cy/Cx.

In order to make the indication of the brightness increase index consistent in different situations, when the maximum brightness Cx is greater than or equal to Cmax, and the brightness increase index is represented by 0, then the brightness increase index is correspondingly indicated by (Cy-Cx)/Cx when the maximum brightness Cx is smaller than the preset brightness extreme value Cmax; and when the maximum brightness Cx is greater than or equal to Cmax, and the brightness increase index is represented by 1, then the brightness increase index is correspondingly indicated by Cy/Cx, when the maximum brightness Cx is smaller than the preset brightness extreme value Cmax.

Further, the N-bit grayscale data corresponding to the brightness data of each color of each pixel in the image and the brightness increase index of each color of the image stored by the data conversion and storage module 12 may constitute the image data of the image, which may be provided to the data analysis module 13.

The data analysis module 13 acquires the image data of the image, and it can be known from the above description that the image data of the image includes the image data and the brightness increase index of each color, and the brightness increase index of each color of the image represents the degree of increase in the brightness represented by the N-bit grayscale data of the color of each pixel in the image with respect to the actual brightness of the color of the pixel in the image.

The light-emitting module 14 is configured to emit illumination light of each color, and the light-emitting module 14 is further configured to adjust a brightness of the illumination light based on the brightness increase index of the color of the image. The image modulation module 15 is configured to modulate, based on the N-bit grayscale data of the image data of each color, the illumination light of the color to generate image light required for displaying the image.

Specifically, when the brightness increase index of a color of the image indicates that the brightness represented by the N-bit grayscale data of the color of each pixel in the image is not increased with respect to the actual brightness of the color of the pixel in the image, the light-emitting module 14 adjusts, based on the brightness increase index of the color, the brightness of the emitted illumination light of the color to a preset standard brightness Lo of the color. When the brightness increase index of the color of the image indicates that the brightness represented by the N-bit grayscale data of the color of each pixel in the image is increased with respect to the actual brightness of the color of the pixel in the image, the light-emitting module 14 adjusts, based on the brightness increase index of the color, the brightness of the light of the color in the emitted illumination light to Lt, and the brightness Lt is smaller than the preset standard brightness Lo.

Specifically, when the brightness represented by the N-bit grayscale data of the color of each pixel in the image is not increased with respect to the actual brightness of the color of the pixel in the image, the light-emitting module 14 lowers, in relation to the preset standard brightness Lo, the brightness of the light of the color in the illumination light inverse-proportionally based on the degree represented by the brightness increase index. For example, when the brightness increase index is 1 or Cy/Cx, the Lo/Lt may correspondingly be 1 or Cy/Cx, and when the brightness increase index is 0 or (Cy-Cx)/Cx, correspondingly, (Lo-Lt)/Lt=0 or (Lo-Lt)/Lt=(Cy-Cx)/Cx.

In addition, it can be understood that from another angle of understanding and interpretation, the brightness increase index of the color of the image can also be regarded as indicating the degree of increase in the brightness represented by the maximum gray level in the N-bit grayscale data of the color of each pixel in the image with respect to the maximum brightness of the actual brightness of the color of the pixel in the image. Further, as described above, the brightness increase index of the color of the image is: a ratio of the brightness represented by the maximum gray level of the N-bit grayscale data of the color of each pixel in the image to the maximum brightness of the actual brightness of the color of all pixels in the image, such as 1 or Cy/Cx, or a ratio of a difference between the brightness represented by the maximum gray level of the N-bit grayscale data of the color of each pixel in the image and the maximum brightness of the actual brightness of the color of all pixels in the image to the maximum brightness of the actual brightness of the color of all pixels in the image, such as 0 or (Cy-Cx)/Cx.

As mentioned above, the image data of the image includes image data of at least two colors and brightness increase indices of the at least two colors, and the image data of each color includes N-bit grayscale data representing the brightness corresponding to the color of each pixel in the image. The illumination light emitted by the light-emitting module 14 also includes light of the at least two colors. The light-emitting module 14 adjusts a brightness of light of each color in the illumination light based on the brightness increase index of the color of the image, and the image modulation module 15 modulates, based on the N-bit grayscale data of the image data of each color, the illumination light of the color to generate image light required for displaying the image.

In detail, in an embodiment, the data analysis module 13 receives the image data of the image, which may include data of one frame of image, and may have data of sub-frame image data of a first color (such as blue), sub-frame image data of a second color (such as red), sub-frame image data of a third color (such as green), and brightness increase indices corresponding to the three colors. The illumination light emitted by the light-emitting module may also include light of the first color, light of the second color, and light of the third color, and brightness of the light of the first color, the light of the second color, and the light of the third color may be controlled based on respective brightness increase indices. The image modulation module 15 may modulate, based on the N-bit grayscale data of the sub-frame image data of each color, light of the color to generate image light of the color required for displaying the image.

Specifically, when the color is a first color (such as blue), the preset brightness extreme value Cmax and the preset brightness Cy of the first color of each pixel in the image are a preset brightness extreme value Cmax1 and a preset brightness Cy1, respectively. When the maximum brightness Cx1 of the color of each pixel in the image is greater than or equal to the preset brightness extreme value Cmax1, the data conversion and storage module 12 stores and outputs the N-bit grayscale data of the first color and the brightness increase index of the first color to the data analysis module 13, the N-bit grayscale data of the first color may be provided to the image modulation module 15, the brightness increase index of the first color may be provided to the light-emitting module 14, the light-emitting module 14 adjusts the brightness of the light of the first color in the emitted illumination light to the preset standard brightness Lo1 based on the brightness increase index of the first color, and the image modulation module 15 modulates, based on the N-bit grayscale data of the first color, the light of the first color having the brightness of the preset standard brightness Lo1 to generate image light of the first color. When the maximum brightness Cx1 of the first color of each pixel in the image is smaller than the preset brightness extreme value Cmax1 (and smaller than or equal to the preset brightness Cy1), the light-emitting module 14 adjusts, based on the brightness increase index of the first color, the brightness of the light of the first color in the emitted illumination light to Lt1, which is smaller than the brightness Lo1, and the image modulation module 15 modulates, based on the N-bit grayscale data of the first color, the light of the first color having the brightness Lt1 to generate image light of the first color.

When the color is a second color (such as red), the preset brightness extreme value Cmax and the preset brightness Cy of the second color of each pixel in the image are a preset brightness extreme value Cmax2 and a preset brightness Cy2, respectively. When the maximum brightness Cx2 of the color of each pixel in the image is greater than or equal to the preset brightness extreme value Cmax2, the data conversion and storage module 12 stores and outputs the N-bit grayscale data of the second color and the brightness increase index of the second color to the data analysis module 13, the N-bit grayscale data of the second color may be provided to the image modulation module 15, the brightness increase index of the second color may be provided to the light-emitting module 14, the light-emitting module 14 adjusts the brightness of the light of the second color in the emitted illumination light to a preset standard brightness Lo2 based on the brightness increase index of the second color, and the image modulation module 15 modulates, based on the N-bit grayscale data of the second color, the light of the second color having the brightness of the preset standard brightness Lo2 to generate image light of the second color. When the maximum brightness Cx2 of the second color of each pixel in the image is smaller than the preset brightness extreme value Cmax2 (and smaller than or equal to the preset brightness Cy2), the light-emitting module 14 adjusts the brightness of the light of the second color in the emitted illumination light to Lt2 based on the brightness increase index of the second color, the brightness Lt2 being smaller than the brightness Lo2, and the image modulation module 15 modulates, based on the N-bit grayscale data of the second color, the light of the second color having the brightness to generate image light of the second color.

When the color is a third color (such as green), the preset brightness extreme value Cmax and the preset brightness Cy of the third color of each pixel in the image are a preset brightness extreme value Cmax3 and preset brightness Cy3, respectively. When the maximum brightness Cx3 of the color of each pixel in the image is greater than or equal to the preset brightness extreme value Cmax3, the data conversion and storage module 12 stores the N-bit grayscale data of the third color and the brightness increase index of the third color and outputs them to the data analysis module 13. The N-bit grayscale data of the third color may be provided to the image modulation module 15, the brightness increase index of the third color may be provided to the light-emitting module 14, the light-emitting module 14 increases a brightness of light of the third color in the emitted illumination light to a preset standard brightness Lo3 based on the brightness increase index of the third color, and the image modulation module 15 modulates, based on the N-bit gray scale data of the third color, the light of the third color having the brightness of the preset standard brightness Lo3 to generate image light of the third color; and when the maximum brightness Cx3 of the third color of each pixel in the image is smaller than the preset brightness extreme value Cmax3 (and smaller than or equal to the preset brightness Cy3), the light-emitting module 14 increases the brightness of the light of the third color in the emitted illumination light to Lt3 based on the brightness increase index of the third color, the brightness Lt3 is smaller than the brightness Lo3, and the image modulation module 15 modulates, based on the N-bit grayscale data of the third color, the light of the third color having the brightness Lt3 to generate image light of the third color.

It can be understood that a ratio of the preset brightness extreme value Cmax1 to the preset brightness Cy1 may be equal to a ratio of the brightness Lo1 to the brightness Lt1; a ratio of the preset brightness extreme value Cmax2 to the preset brightness Cy2 may be equal to a ratio of the brightness Lo2 to the brightness Lt2; and a ratio of the preset brightness extreme value Cmax3 to the preset brightness Cy3 may be equal to a ratio of the brightness Lo3 to the brightness Lt3. Cy1 can be equal to Cx1, Cy2 can be equal to Cx2, and Cy3 can be equal to Cx3.

Figure 3:
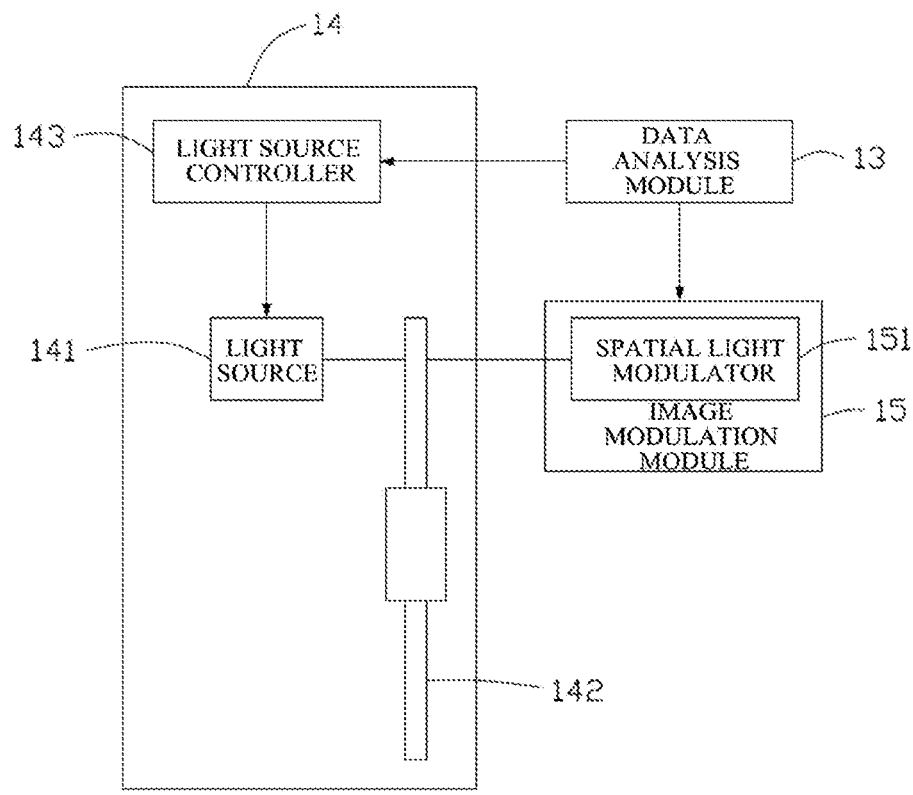
FIG. 3 is a structural schematic diagram of an embodiment of a display apparatus of the image processing and display apparatus shown in FIG. 2.
Figure 4:
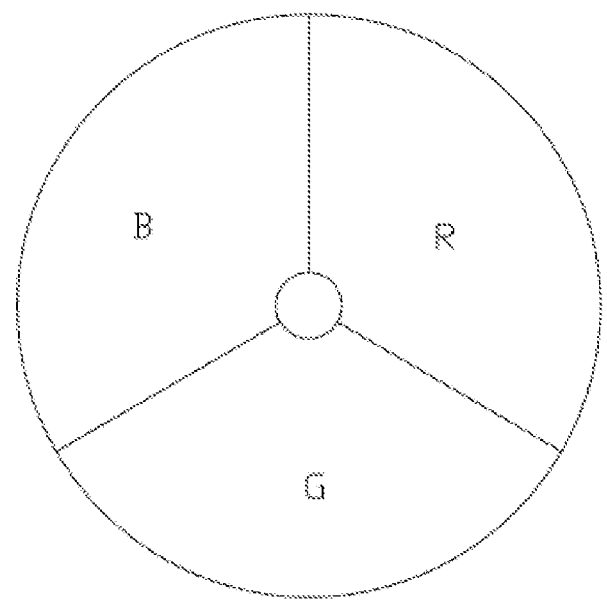
FIG. 4 is a structural schematic diagram of a color wheel of a light-emitting module of the display apparatus shown in FIG. 3.

Further, in an embodiment, in the display apparatus 30 of the image processing and display apparatus 10, the light-emitting module 14 can sequentially emit light of each color, the image modulation module 15 may include one spatial light modulator, and the spatial light modulator may sequentially modulate light of each color based on the N-bit grayscale data of the image data of the color. Specifically, referring to FIG. 3 and FIG. 4, FIG. 3 is a structural schematic diagram of an embodiment of the display apparatus 30 of the image processing and display apparatus 10 shown in FIG. 2, and FIG. 4 is a structural schematic diagram of a color wheel of the light-emitting module 14 of the display apparatus 30 shown in FIG. 3. In the embodiment, the image modulation module 15 includes one spatial light modulator 151, and the light-emitting module 14 includes a light source 141, a segmented color wheel 142, and a light source controller 143. The light source 141 emits excitation light. The segmented color wheel 142 is located in a light path of the excitation light emitted by the light source 141, and is configured to receive the excitation light and sequentially emit the light of each color. Light of each color sequentially emitted by the light-emitting module 14 is irradiated to the spatial light modulator 151 in a time-division manner. The light source controller 143 controls, based on the brightness increase index of each color of the image, the brightness of the excitation light emitted by the light source 141 (such as, to control power of the excitation light), to control the brightness of light of each color emitted by the light-emitting module 14, to further control a ratio of light of each color. The spatial light modulator 151 receives light of each color emitted by the light-emitting module 14 and modulates light of each color emitted by the light-emitting module 14 based on corresponding N-bit grayscale data to generate image light.

It can be understood that the segmented color wheel 142 includes at least two segmented regions, such as a blue segmented region B, a red segmented region R, and a green segmented region G. The blue segmented region B may be provided with a scattering material or a blue fluorescent material or (the blue segmented region may be provided with the scattering material when the excitation light is blue light, and the blue segmented region B is provided with the blue fluorescent material when the excitation light is ultraviolet light), the red segmented region R is provided with a red fluorescent material, and the green segmented region G is provided with a green fluorescent material. When the light-emitting module 14 is in operation, the segmented color wheel 142 rotates around a center of circle, so that the at least two segmented regions are located in the light path of the excitation light in a time division manner, thereby generating sequential light of each color (for example, sequentially emitting light of the first color, light of the second color, and light of the third color). Specifically, it can be understood that the light emitted by the segmented color wheel 142 can be guided to the spatial light modulator 151 via optical relay elements (not shown) such as a light-homogenizing device and a collecting lens, which will not be described in detail here.

The spatial light modulator may be a DMD, LCD, or LCOS, which may include a plurality of modulation units (such as a mirror unit or a liquid crystal pixel unit), and each modulation unit may correspondingly modulate the image light of one pixel.

According to the above, in the embodiment, the brightness (or power) of light of each color emitted by the light-emitting module 14 can be modulated in a universe of 0-100%, in cooperation with the image modulation module 15 modulating light of each color based on the corresponding N-bit grayscale data to generate image light, which can sufficiently increase the dynamic range of the image displayed by the display apparatus 30.

Figure 5:
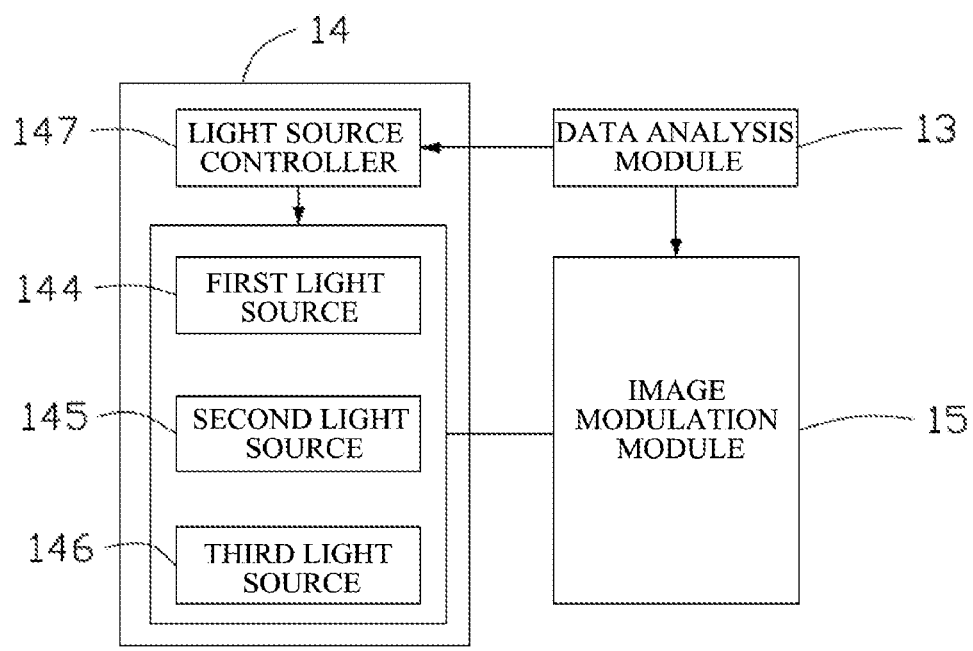
FIG. 5 is a structural schematic diagram of another embodiment of the display apparatus of the image processing and display apparatus shown in FIG. 2.

Further, referring to FIG. 5, FIG. 5 is a structural schematic diagram of another embodiment of the display apparatus 30 of the image processing and display apparatus 10 shown in FIG. 2. Different from the above embodiment, in another embodiment, the light-emitting module 14 includes color light sources 144, 145, and 146 each corresponding to light of each color and a light source controller 147. The light source controller 147 adjusts a brightness of light of the color emitted by each of the color light sources based on the brightness increase index of the color of the image. Specifically, the light-emitting module 14 may include a first light source 144, a second light source 145, and a third light source 146. The first light source 144 is configured to emit light of a first color (such as blue light), the second light source 145 is configured to emit light of a second color (such as red light), and the third light source 146 is configured to emit light of a third color (such as green light). Each of the first light source 144, the second light source 145, and the third light source 146 may be a laser light source but not limited thereto. The light source controller 147 may adjust the brightness of light of each color emitted by each color light source based on the brightness increase index of the color. It can be understood that in another embodiment, the brightness (or power) of light of each color emitted by the light-emitting module 14 can be modulated in a universe of 0-100%, in cooperation with the image modulation module 15 modulating light of each color based on the corresponding N-bit grayscale data to generate image light, which can sufficiently increase the dynamic range of the image displayed by the display apparatus 30.

In the embodiment shown in FIG. 5, light of each color emitted by the light-emitting module 14 is emitted by the three light sources 144, 145, and 146, respectively. Therefore, the time sequence and intensity of the light emitted by the three light sources 144, 145, and 146 can be controlled by the light source controller 147, so as to control the time sequence and intensity of light of each color. The image modulation module 15 may include a spatial light modulator, which receives light of each color and modulates light of each color based on the corresponding N-bit grayscale data, to generate image light. Since the time sequence of light of each color needs to be adapted to the modulation time sequence of the image modulation module, the number and the modulation time sequence of the spatial light modulators of the image modulation module 15 correspond to the time sequence of light of each color emitted by the light-emitting module 14. In the embodiment shown in FIG. 5, the image modulation module 15 may be the same as the embodiment shown in FIG. 3 and includes one spatial light modulator sequentially receiving and modulating light of each color; or the image modulation module 15 includes three spatial light modulators, and the three spatial light modulators can generate image light respectively based on the light of the color corresponding to the corresponding N-bit grayscale data in a same period or in different periods, so in this case, the three light sources 144, 145, and 146 need to emit light of each color simultaneously or at different time. The spatial light modulator may be a DMD, an LCD or an LCOS but not limited thereto.

Compared to the related art, in the image processing and display apparatus 10, based on whether the maximum brightness Cx of each color of each pixel in the image is greater than the preset brightness extreme value Cmax, the brightness data of the color of the image is controlled to store the N-bit grayscale data of the image based on the preset brightness extreme value Cmax or the preset brightness Cy (greater than or equal to the maximum brightness Cx) and to store the brightness increase index of the color. When modulating an image based on the N-bit grayscale data, the illumination light for modulating the image may be controlled to be adapted to the preset brightness extreme value Cmax or the preset brightness Cy based on the brightness increase index, so as to divide a brightness region based on the preset brightness extreme value Cmax or the preset brightness Cy and modulate light of each color based on the N-bit grayscale data having the M gray levels. As a result, not only brightness information of each color of each pixel in the image can be accurately restored, but also the brightness represented by the N-bit grayscale data is increased compared to the actual brightness of the corresponding color of the image when the N-bit grayscale data of the image is stored based on the preset brightness Cy. In view of this, many darkness details of the image can be exhibited by modulating light of the corresponding color using the N-bit grayscale data which represents the brightness being increased, and thus the image can be more accurately and delicately restored, that is, the contrast and the dynamic range of the displayed image are relatively high. In addition, when the maximum brightness Cx is smaller than the preset brightness extreme value Cmax, since each color image (such as each sub-frame of image) of the image can be restored and displayed using all the M gray levels, not only the darkness details of the displayed image are exhibited, but also the degree of delicateness of the displayed image can be increased and the actual brightness of the displayed image can be more accurately restored.

For example, based on the brightness interval data in Tables 1 and 2, it can be known that for the Table 2, when the maximum brightness Cx is smaller than the preset brightness extreme value Cmax, evenly dividing the brightness interval based on the interval of [0, Cy) and associating it with the M-1 gray levels can make a value range (800/7) of the brightness interval of each gray level smaller than a value range (1300/7) of the brightness interval in Table 1, so that the corresponding division of each gray level in Table 2 is more delicate. For example, if the brightness data is 150, in Table 1, its corresponding gray level is 0, the image data when the image modulation module is modulating the light is also 0, so no corresponding image light is generated. Therefore, according to Table 1, the brightness data 150 cannot be modulated and exhibited. However, in Table 2, the gray level corresponding to the brightness data 150 is 1, and the image data when the image modulation module 15 is modulating the light of which the brightness has been lowered by the light-emitting module is 1, so the brightness data 150 can be accurately restored and exhibited. It can be seen that with the image processing and display apparatus 10 of the present disclosure, many darkness details of an image can be restored and exhibited, such as the darkness details in a range from 114.285714285714 to 185.714285714285. However, it can be understood that for images having different maximum brightness, the range of the darkness details that can be exhibited with respect to Table 1 will differently depend on respective maximum brightness, and the lower maximum brightness Cx leads to the greater range of darkness details that can be exhibited by the image processing and display apparatus 10 of the present disclosure.

In addition, division of each corresponding gray level in Table 2 is finer, thereby improving the delicateness of the displayed image and thus more accurately restoring the image. When the maximum brightness Cx is smaller than the preset brightness extreme value Cmax, if the gray level division method in Table 1 is adopted, then the gray level corresponding to the brightness data 800 is 4, that is, if the gray level division method in Table 1 is adopted, the image can only be restored and exhibited by a maximum of 5 grayscales within 0-4. However, if the gray level division method in Table 2 is adopted, the gray level corresponding to the brightness data 800 is 7, that is, the image can be restored and exhibited by all 8 grayscales within 0-7. Moreover, through using the image processing and display apparatus 10 of the present disclosure, each image can be restored and exhibited using all 8 grayscales, so that not only the darkness details of the displayed image are exhibited, but also the degree of delicateness of the displayed image can be increased and the actual brightness of the displayed image can be more accurately restored.

Figure 6:
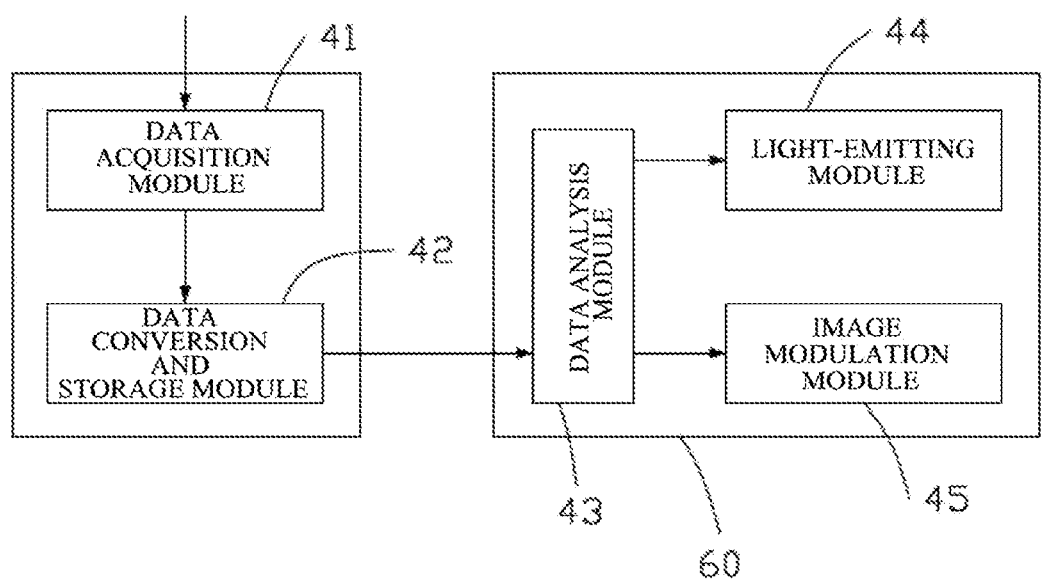
FIG. 6 is a structural schematic block diagram of an image processing and display apparatus according to a second embodiment of the present disclosure.

Referring to FIG. 6, FIG. 6 is a structural schematic diagram of a second embodiment of the image processing and display apparatus 40 according to the present disclosure. The image processing and display apparatus 40 of the second embodiment is basically the same as the image processing and display apparatus 10 of the first embodiment. That is, the foregoing description of the image processing and display apparatus 40 of the first embodiment can basically be applied to the image processing and display apparatus 10 of the second embodiment, and a difference between the two mainly lies in that the light-emitting module 44 of the display apparatus 60 is somewhat different, so that image light, which is generated by the image modulation module 45 modulating the light of the light-emitting module 44 based on the image data output by the data analysis module 43, is also somewhat different.

Specifically, in the second embodiment, the illumination light emitted by the light-emitting module 44 includes mixed chromatic light (such as yellow light) of at least two colors (e.g., the second color and the third color are red and green). The light-emitting module 44 adjusts a brightness of mixed chromatic light based on a smaller one of the brightness increase indices corresponding to the at least two colors, such that when the brightness represented by the N-bit grayscale data of the color of each pixel in the image is increased with respect to the actual brightness of the color of the pixel in the image, the brightness Lt of the light of the corresponding color emitted by the light-emitting module 44 is smaller than the preset standard brightness Lo of the light of the corresponding color.

In detail, when the color is a first color (such as blue), the data analysis module 43 is configured to receive image data of the first color (which includes the N-bit grayscale data of the first color and the brightness increase index corresponding to the first color, and can be regarded as sub-frame image data of the first color), image data of the second color (which includes the N-bit grayscale data of the second color and the brightness increase index corresponding to the second color and can be regarded as sub-frame image data of the second color), and image data of the third color (which includes the N-bit grayscale data of the third color and the brightness increase index corresponding to the third color and can be regarded as sub-frame image data of the third color) corresponding to the image data of the image (such as data of one frame of image), the illumination light provided by the light-emitting module 44 to the image modulation module 45 includes light of the first color and light of the fourth color, and the light of the fourth color is mixed of the light of the second color and the light of the third color. The light-emitting module 44 adjusts, based on the brightness increase index representing the first color, the brightness of the light of the first color provided to the image modulation module 45. The image modulation module 45 modulates the light of the first color in the illumination light based on the N-bit grayscale data of the sub-frame image data of the first color, to generate image light of the first color required for displaying the image.

Specifically, the preset brightness extreme value Cmax and the preset brightness Cy of the first color of each pixel in the image are respectively the preset brightness extreme value Cmax1 and the preset brightness Cy1. When the maximum brightness Cx1 of the first color of each pixel in the image is greater than or equal to the preset brightness extreme value Cmax1, the data conversion and storage module 42 stores the N-bit grayscale data of the first color and the brightness increase index of the first color and outputs them to the data analysis module 43, the N-bit grayscale data of the first color may be provided to the image modulation module 15, the brightness increase index of the first color may be provided to the light-emitting module 14, the brightness of the light of the first color in the illumination light emitted by the light-emitting module 44 based on the brightness increase index of the first color is a preset standard brightness Lo1, and the image modulation module 45 modulates, based on the N-bit grayscale data of the first color, the light of the first color having the brightness of the preset standard brightness Lo1 to generate image light of the first colors. When the maximum brightness Cx1 of the first color of each pixel in the image is smaller than the preset brightness extreme value Cmax1 (and smaller than or equal to the preset brightness Cy1), the brightness Lt of the light of the first color in the illumination light emitted by the light-emitting module 44 based on the brightness increase index of the first color is Lt1, which is smaller than the brightness Lo1, and the image modulation module 45 modulates, based on the N-bit grayscale data of the first color, the light of the first color having the brightness Lt1 to generate image light of the first color.

The light-emitting module 44 further adjusts the brightness of the light of the fourth color in the illumination light based on a smaller one of the brightness increase indices of the second color (such as red) and the third color (such as green). The image modulation module 45 modulates, based on the N-bit grayscale data of the second color, the fourth image light or the light of the second color in the fourth image light to generate image light of the second color required for displaying the image. The image modulation module 45 modulates, based on the N-bit grayscale data of the sub-frame image data of the third color, the fourth image light or the light of the third color in the fourth image light to generate image light of the third color required for displaying the image.

Specifically, when the smaller brightness increase index is the brightness increase index of the second color and the maximum brightness Cx2 of the second color of each pixel in the image is greater than or equal to the preset grayscale extreme value Cmax2 of the second color, the data conversion and storage module 42 stores the N-bit grayscale data of the second color and the brightness increase index of the second color and outputs them to the data analysis module 43, the N-bit grayscale data of the second color may be provided to the image modulation module 45, the brightness increase index of the second color may be provided to the light-emitting module 44, the brightness of the light of the second color in the light of the fourth color emitted by the light-emitting module 44 is a preset standard brightness of Lo2, and the image modulation module 45 further modulates, based on the N-bit grayscale data of the second color, the light of the second color having the brightness of the preset standard brightness Lo2 to generate image light, and further modulates, based on the N-bit grayscale data of the third color, the light of the third color in the light of the fourth color (in this case, the brightness of the light of the second color in the light of the fourth color is Lo2) to generate image light. When the smaller brightness increase index is the brightness increase index of the second color and the maximum brightness Cx2 of the second color is smaller than the preset grayscale extreme value Cmax2 of the second color (and smaller than or equal to the preset brightness Cy2), the brightness of the light of the second color in the light of the fourth color emitted by the light-emitting module 44 is Lt2, which is smaller than Lo2, and the image modulation module 45 further modulates, based on the N-bit grayscale data of the second color, the light of the second color having the brightness Lt2 to generate image light, and further modulates, based on the N-bit grayscale data of the third color, the light of the third color in the light of the fourth color (in this case, the brightness of the light of the second color in the light of the fourth color is Lt2) to generate image light.

When the smaller brightness increase index is the brightness increase index of the third color and the maximum brightness Cx3 of the third color of each pixel in the image is greater than or equal to the preset grayscale extreme value Cmax3 of the third color, the data conversion and storage module 42 stores the N-bit grayscale data of the third color and the brightness increase index of the third color and outputs them to the data analysis module 43, the N-bit grayscale data of the third color may be provided to the image modulation module 45, the brightness increase index of the third color may be provided to the light-emitting module 44, the brightness of the light of the third color in the light of the fourth color emitted by the light-emitting module 44 is a preset standard brightness of Lo3, and the image modulation module 45 further modulates, based on the N-bit grayscale data of the third color, the light of the third color having the brightness of the preset standard brightness Lo3 to generate image light, and further modulates, based on the N-bit grayscale data of the second color, the light of the second color in the light of the fourth color (in this case, the brightness of the light of the third color in the light of the fourth color is Lo3) to generate image light. When the smaller brightness increase index is the brightness increase index of the third color and the maximum brightness Cx3 of the third color is smaller than the preset grayscale extreme value Cmax3 of the third color (and smaller than or equal to the preset brightness Cy3), the brightness of the light of the third color in the light of the fourth color emitted by the light-emitting module 44 is Lt3, which is smaller than Lo3, and the image modulation module 45 further modulates, based on the N-bit grayscale data of the third color, the light of the third color having the brightness Lt3 to generate image light, and further modulates, based on the N-bit grayscale data of the second color, the light of the second color in the light of the fourth color (in this case, the brightness of the light of the third color in the light of the fourth color is Lt3) to generate image light.

It can be understood that a ratio of the preset brightness extreme value Cmax1 to the preset brightness Cy1 may be equal to a ratio of the brightness Lo1 to the brightness Lt1; a ratio of the preset brightness extreme value Cmax2 to the preset brightness Cy2 may be equal to a ratio of the brightness Lo2 to the brightness Lt2; and a ratio of the preset brightness extreme value Cmax3 to the preset brightness Cy3 may be equal to a ratio of the brightness Lo3 to the brightness Lt3.

Figure 7:
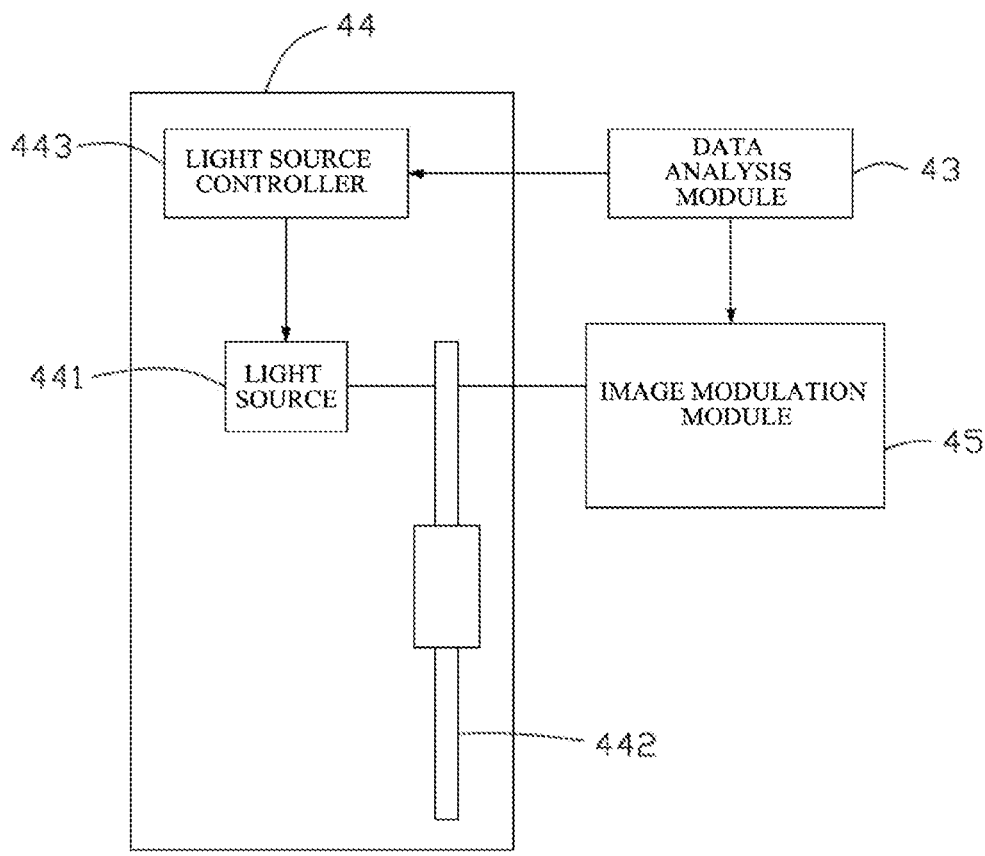
FIG. 7 is a structural schematic diagram of an embodiment of a display apparatus of the image processing and display apparatus shown in FIG. 6.
Figure 8:
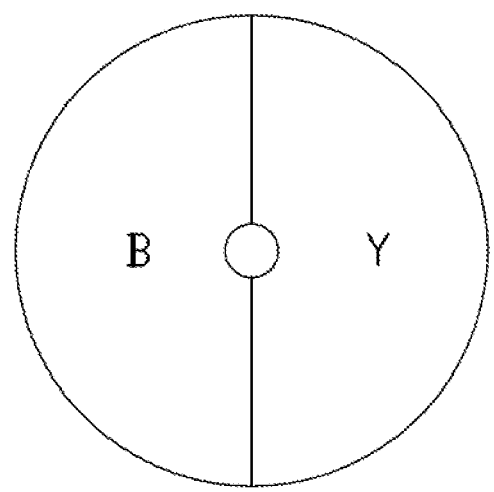
FIG. 8 is a structural schematic diagram of a color wheel of a light-emitting module of the display apparatus shown in FIG. 7.

Referring to FIG. 7 and FIG. 8, FIG. 7 is a structural schematic diagram of an embodiment of the display apparatus 60 of the image processing and display apparatus 40 shown in FIG. 6, and FIG. 8 is a structural schematic diagram of a color wheel of the display apparatus 60 shown in FIG. 7. In the embodiments shown in FIG. 7 and FIG. 8, the light-emitting module 44 includes a light source 441, a color wheel 442, and a light source controller 443. The light source 441 emits excitation light. The color wheel 442 includes at least two segmented regions B and Y, and the two segments of the B and Y segments are periodically located in the light path of the excitation light in a time division manner. The segmented region B receives the excitation light (blue excitation light) and emits the excitation light as light of the first color among light of each color. The segmented region Y has a fluorescent material (such as a yellow fluorescent material) and receives the excitation light to generate fluorescence as the mixed chromatic light (that is, the light of the fourth color). The light source controller 443 controls, based on the smaller one of the brightness increase indices of the colors of the second color and the third color, the brightness of the excitation light emitted by the light source 441 to control the brightness of the mixed chromatic light emitted by the light-emitting module 44.

It can be understood that, in the embodiment, the brightness of the light of the first color can achieve modulation in a universe of 0-100% by modulating the brightness of the excitation light emitted by the light source 441, but the light of the second color and the light of the third color (such as red light and green light) are contributed by the fluorescent material on the color wheel 442, and a ratio of the light of the second color to the light of the third color (such as red light and green light) has been fixed, so the mixed chromatic light can only be adjusted based on one brightness increase index to achieve the brightness adjustment of light of one color, while light of the other color cannot be adjusted based on its corresponding brightness increase index. In an embodiment, adjusting the mixed chromatic light based on a smaller one of the brightness adjustment indices of the second color and the third color can avoid a situation in which use of a greater brightness adjustment index leads to an excessive increase in the brightness data of each pixel of the color corresponding to the smaller brightness adjustment index and further leads to that a gray level having a higher brightness cannot be exhibited. This can lead to the more gray levels for the displayed image, and thus the more delicate image and the better effect. It can be understood that after using a smaller brightness adjustment index (such as red) to adjust the mixed chromatic light, based on a ratio between the smaller brightness adjustment index (such as red) and the greater brightness adjustment index (such as green), the N-bit grayscale data of the greater brightness adjustment index (such as green) may be further reduced inverse-proportionally, in order to make a size of the N-bit grayscale data (such as green), on which the image modulation module depends, be adapted to the brightness of light of the corresponding color in the light of the corresponding mixed color, thereby accurately restoring the image.

Further, in this embodiment, the number and the modulation time sequence of the spatial light modulator of the image modulation module 45 need to be adapted to the time sequence of light of each color emitted by the light-emitting module. The spatial light modulator may be a DMD, an LCD, or an LCOS but not limited thereto. Specifically, the image modulation module 45 may include a first spatial light modulator and a second spatial light modulator, a light-splitting device (such as a wavelength light-splitting sheet) may be used to divide the mixed chromatic light into light of the second color and light of the third color and to provide the light of the second color to the first spatial light modulator and provide the light of the third color to the second spatial light modulator. The first spatial light modulator modulates in a first period, based on the N-bit grayscale data of the first color, the light of the first color to generate image light. The first spatial light modulator may further modulate in a second period, based on the N-bit grayscale data of the second color, the light of the second color in the mixed chromatic light to generate image light. The second spatial light modulator may further modulate in the second period, based on the N-bit grayscale data of the third color, the light of the third color in the mixed chromatic light to generate image light. The image modulation module may include a first spatial light modulator, a second spatial light modulator, and a third spatial light modulator, the first spatial light modulator modulates in the first period, based on the N-bit grayscale data of the first color, the light of the first color to generate image light, the second spatial light modulator may also modulate in the second period, based on the N-bit grayscale data of the second color, the light of the second color in the mixed chromatic light to generate image light, and the third spatial light modulator may further modulate in the second period, based on the N-bit grayscale data of the third color, the light of the third color in the mixed chromatic light to generate image light.

Figure 9:
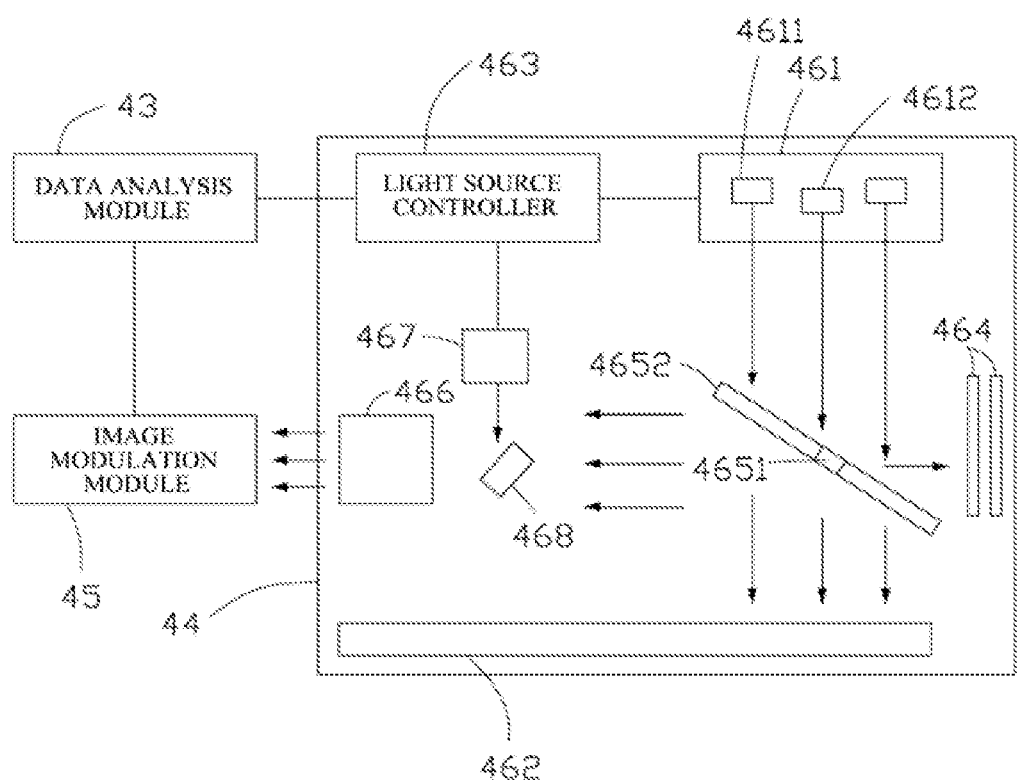
FIG. 9 is a structural schematic diagram of another embodiment of the display apparatus of the image processing and display apparatus shown in FIG. 6.
Figure 10:
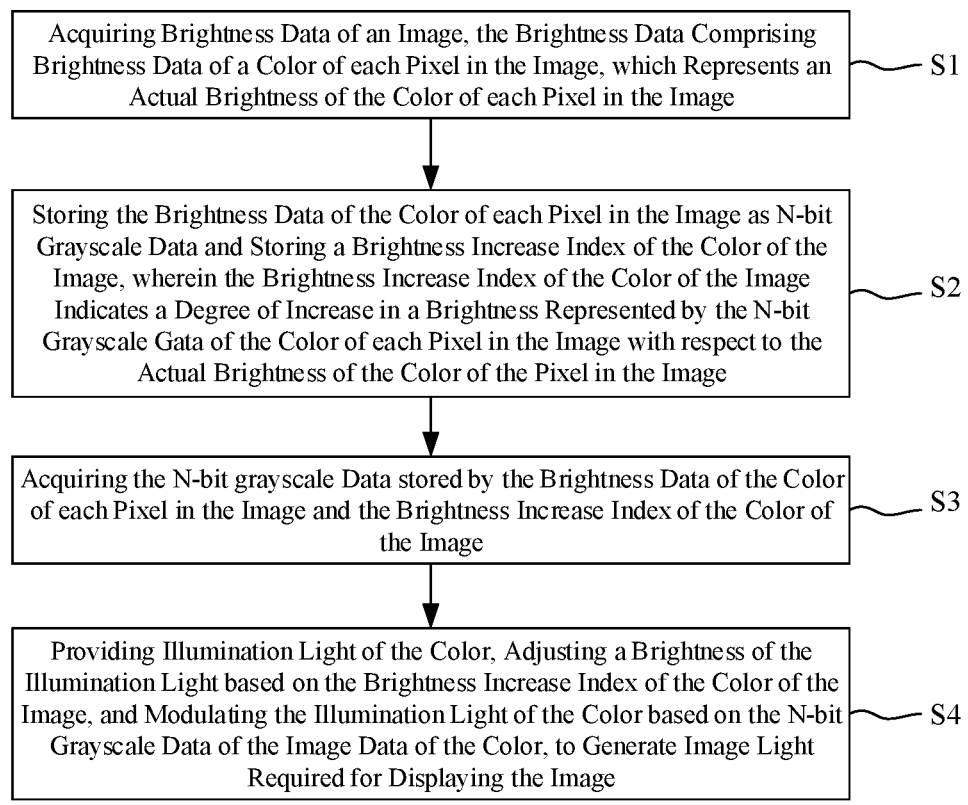
FIG. 10 is a flowchart of an image processing and display method of an image processing and display apparatus of the present disclosure.

Referring to FIG. 9, FIG. 9 is a structural schematic diagram of another embodiment of the display apparatus 60 of the image processing and display apparatus 40 shown in FIG. 6. In the embodiment shown in FIG. 9, the light-emitting module 44 further includes a light source 461, a color wheel 462, a light source controller 463, a scattering-reflecting sheet 464, a light-splitting sheet 465, a light-homogenizing device 466, a supplemental light source 467, and a dichroic film 468. The light-splitting sheet 465 includes a first region 4651 and a second region 4652. The light source 461 emits excitation light (such as blue excitation light). A part of the excitation light is irradiated to the first region 4651, and the first region 4651 guides (e.g., reflects) the part of the excitation light to the scattering-reflecting sheet 464. The scattering-reflecting sheet 464 scatters and reflects the part of the excitation light to the light-splitting sheet 465. The second region 4652 of the light-splitting sheet 465 guides (e.g. transmits) the part of the excitation light to the light-homogenizing device 466. The light-homogenizing device 466 homogenizes and emits the part of the excitation light as light of one color (such as light of the first color) in light of each color. Another part of the excitation light is irradiated to the second region 4652, and the second region 4652 guides (e.g., transmits) the other part of the excitation light to the color wheel. A fluorescent material (such as a yellow fluorescent material) is disposed on the color wheel 462, and receives another part of the excitation light to generate fluorescence as the mixed chromatic light (such as yellow light). The mixed chromatic light is guided (e.g., reflected) by the color wheel to the light-splitting sheet 465. The light-splitting sheet 465 also guides (e.g., reflects) the mixed chromatic light to the light-homogenizing device 466, and the light-homogenizing device 466 emits homogenized mixed chromatic light. The excitation light may be blue excitation light, such as blue excitation, and a yellow fluorescent material may be disposed on the color wheel 462, and the mixed chromatic light may be yellow light. The first region 4651 may be located in a central region of the light-splitting sheet 465 and may be a coating film capable of reflecting blue light. The second region 4652 may be located in a periphery of the first region 4625 and may be a coating film that can transmit blue light and reflect yellow light.

It can be understood that the light source 461 may include two light-emitting elements 4611, 4612 (such as two laser modules) that emit the part of the excitation light and the other part of the excitation light, respectively. Then, the light source controller 463 can control light emission intensities of the two light-emitting elements 4611 and 4612 based on a smaller one of the brightness increase indices corresponding to the at least two colors.

Further, the supplemental light source 467 is configured to emit supplemental light. The supplemental light is also guided to the image modulation module 45. The supplemental light has a component of light of one color in the mixed chromatic light. The light source controller 463 controls, based on a smaller one of the brightness increase indices corresponding to the at least two colors, a brightness of the supplemental light emitted by the supplemental light source 467. The dichroic film 468 is disposed between the light-splitting sheet 465 and the light-homogenizing device 466. The supplemental light source 467 emits the supplemental light to the dichroic film 468. The dichroic film 468 reflects the supplemental light to the light-homogenizing device 466. The part of the excitation light and at least part light of the mixed chromatic light are further transmitted through the dichroic film 468 and then guided to the light-homogenizing device 466.

In this embodiment, the supplemental light may be the light of the second color such as red laser light, thus the light of the second color emitted by the light-emitting module 44 has a part contributed by the fluorescent material and a part contributed by the supplemental light, and the light of the second color and the light of the third color in the mixed chromatic light emitted by the light-emitting module 44 are adjustable to a certain extent but cannot be 100% modulated. It can be understood that, in this embodiment, the supplemental light is the light of the second color such as red laser light, but it can be understood that in a modified embodiment, the supplemental light may also be the light of the third color such as green laser light, or the supplemental light may include light of two colors including the second color and the third color, such as red laser light and green laser light.

Further, in this embodiment, the number and the modulation time sequence of the spatial light modulator of the image modulation module 45 need to be adapted to the time sequence of light of each color emitted by the light-emitting module. The image modulation module 45 may include spatial light modulators corresponding to light of each color in one-to-one correspondence. The spatial light modulators of the respective colors can perform image modulation at the same time, and light of each color emitted by the light-homogenizing device 466 may further provide light of the color to a corresponding spatial light modulator of the color through a light-splitting device (not shown). The spatial light modulator may be a DMD, an LCD, or an LCOS but not limited thereto.

For example, when light of each color includes light of the first color, light of the second color, and light of the third color, the image modulation module 45 may include a first spatial light modulator, a second spatial light modulator, and a third spatial light modulator. The light-splitting device (not shown) can split light of each color emitted by the light-homogenizing device 466 of the light-emitting module 44, provide the light of the first color to the first spatial light modulator, provide the light of the second color to the second spatial light modulator, and provide the light of the third color to the third spatial light modulator. The first spatial light modulator modulates the light of the first color based on the N-bit grayscale data of the first color to generate image light, the second spatial light modulator modulates the light of the second color in the mixed chromatic light based on the N-bit grayscale data of the second color to generate image light, and the third spatial light modulator modulates the light of the third color in the mixed chromatic light based on the N-bit grayscale data of the third color to generate image light.

It can be understood that, compared with the image processing and display apparatus 10 of the first embodiment, in the image processing and display apparatus 40 of the second embodiment, since part of the light emitted by the light-emitting module 44 is mixed chromatic light, it is difficult for light of two colors in the mixed chromatic light to achieve modulation in a universe of 0-100%. However, compared to the related art, the image processing and display apparatus 40 can achieve modulation of light of one color in a universe of 0-100%, thereby increasing the image contrast and the dynamic range of one color, and since light of the other two colors can be partially modulated, the image contrast and the dynamic range of the other two colors can also be increased to a certain extent. The image processing and display apparatus 40 has a higher contrast and a higher dynamic range.

It can be understood that, in a modified embodiment of the image processing and display apparatus 40 of the second embodiment, considering that the light emitted by the light-emitting module 44 of the image processing and display apparatus 40 includes mixed chromatic light and it is difficult to separately adjust the brightness of light of the two colors in the mixed chromatic light, the data conversion and storage module 42 may also store the N-bit grayscale data of the two colors based on the same increase degree when storing the brightness data of the two colors of the image, that is, the brightness increase indices of the two colors are the same. Furthermore, the light-emitting module 44 may adjust the brightness of the mixed chromatic light based on the same brightness increase index.

Specifically, when the data conversion and storage module 42 stores the N-bit grayscale data of the brightness data of the two colors of each pixel in an image, a size ratio relationship of the maximum brightness to the corresponding preset grayscale extreme value of the two colors can determine one brightness increase index. For example, a ratio of the maximum brightness to the preset brightness extreme value of one color (such as the second color) is Cmax2/Cx2, and a ratio of the maximum brightness to the preset brightness extreme value of another color (such as the third color) is Cmax3/Cx3, then the brightness increase index of the color corresponding to a smaller ratio of Cmax2/Cx2 and Cmax3/Cx3 may be selected as the brightness increase index of the two colors. Further, when the data conversion and storage module 42 stores the N-bit grayscale data of the brightness data of the two colors of each pixel in an image, it is assumed that the ratio of Cmax2/Cx2 is smaller than Cmax3/Cx3, then storing of the N-bit grayscale data may be performed in the foregoing manner for the brightness data of the second color, but for the brightness data of the third color, the data conversion and storage module 42 may first reduce the obtained brightness data of the third color in proportion to the brightness increase index and then store the N-bit grayscale data in the foregoing manner based on the reduced brightness data, so that the image modulation module 45 can modulate light of the corresponding color based on the corresponding N-bit grayscale data, so as to accurately restore the two colors of the image.

Referring to FIG. 9, which is a flowchart of an image processing and display method according to the present disclosure. It can be understood that the image processing method can be implemented by using the image display and processing apparatuses 10 and 40 of the first embodiment, the second embodiment (as shown in FIG. 2 and FIG. 6), and modified embodiments thereof. Since the image processing and display apparatuses 10 and 40 have been described in detail above, respective steps S1-S4 of the method used by the image processing and display apparatus 10, 40 will be briefly introduced in the following.

At Step S1, brightness data of an image is acquired. The brightness data includes brightness data of a color of each pixel in the image. The brightness data of the color of each pixel in the image represents an actual brightness of the color of the pixel in the image.

At Step S2, the brightness data of the color of each pixel in the image is stored as N-bit grayscale data and a brightness increase index of each color of the image is stored. The brightness increase index of the color of the image indicates a degree of increase in a brightness represented by the N-bit grayscale data of the color of each pixel in the image with respect to the actual brightness of the color of the pixel in the image, and the N-bit grayscale data is capable of representing M gray levels. The step S2 specifically includes following steps:

Step S21 of acquiring a maximum brightness Cx of the color of each pixel in the image;

Step S22 of determining a brightness interval corresponding to each of the M gray levels and the brightness increase index of the color of the image;

Step S23 of setting, based on the brightness interval to which the brightness data of the color of each pixel belongs, the N-bit grayscale data of the pixel as N-bit grayscale data corresponding to the gray level corresponding to the above brightness interval, and storing the N-bit grayscale data of the pixel; and Step S24 of storing the brightness increase index of the color of the image.

The step S22 includes following steps:

if the maximum brightness Cx is greater than or equal to a preset brightness extreme value Cmax of the color, associating a highest of the M gray levels with a range of brightness greater than or equal to the preset brightness extreme value Cmax, dividing a range of brightness from 0 to the preset brightness extreme value Cmax of the color into M-1 intervals, associating each of the M-1 gray levels below the highest gray level in an ascending order of level with one of M-1 intervals in an ascending order of brightness, and determining the brightness increase index of the color of the image based on the preset brightness extreme value Cmax of the color; and if the maximum brightness Cx is smaller than the preset brightness extreme value Cmax of the color, associating the highest of the M gray levels with a preset brightness Cy of the color, dividing a range of brightness from 0 to the preset brightness Cy of the color into M-1 intervals, associating each of the M-1 gray levels below the highest gray level in an ascending order of level with one of the M-1 intervals in an ascending order of brightness, where Cx<=Cy<Cmax, and determining the brightness increase index of the color of the image based on the preset brightness Cy of the color or based on the preset brightness Cy of the color and the preset brightness extreme value Cmax of the color.

At Step S3, the N-bit grayscale data stored by the brightness data of the color of each pixel in the image and the brightness increase index of the color of the image are acquired.

At Step S4, illumination light of the color is provided, a brightness of the illumination light is adjusted based on the brightness increase index of the color of the image, and the illumination light of the color is modulated based on the N-bit grayscale data of the image data of the color, to generate image light required for displaying the image.

In the step S4, when the brightness increase index of the color of the image indicates that the brightness represented by the N-bit grayscale data of the color of each pixel in the image is not increased with respect to the actual brightness of the color of the pixel in the image, the brightness of the emitted illumination light of the color is adjusted to a preset standard brightness Lo of the color based on the brightness increase index of the color; and when the brightness increase index of the color of the image indicates that the brightness represented by the N-bit grayscale data of the color of each pixel in the image is increased with respect to the actual brightness of the color of the pixel in the image, the brightness of light of the color in the emitted illumination light is adjusted to Lt based on the brightness increase index of the color. The brightness Lt is smaller than the preset standard brightness Lo.

Compared with the related art, in the image processing and display method, based on whether the maximum brightness Cx of the color of each pixel in the image is greater than the preset brightness extreme value Cmax, the brightness data of the color of the image is controlled to store the N-bit grayscale data of the image based on the preset brightness extreme value Cmax or the preset brightness Cy (greater than or equal to the maximum brightness Cx) and to store the brightness increase index of the color. When modulating an image based on the N-bit grayscale data, the illumination light for modulating the image may be controlled to be adapted to the preset brightness extreme value Cmax or the preset brightness Cy based on the brightness increase index, so as to divide a brightness region based on the preset brightness extreme value Cmax or the preset brightness Cy and modulate the illumination light based on the N-bit grayscale data having the M gray levels. As a result, not only brightness information of each sub-frame of image can be accurately restored, but also the brightness represented by the N-bit grayscale data is increased compared to the actual brightness of the color of the image since the N-bit grayscale data of the image is stored based on the preset brightness Cy. In view of this, many darkness details of the image can be exhibited by modulating corresponding illumination light using the N-bit grayscale data which represents the brightness being increased, and thus the image can be more accurately and delicately restored, that is, the contrast and the dynamic range of the displayed image are relatively high.

The above description are only embodiments of the present disclosure, and thus does not limit the patent scope of the present disclosure. Any equivalent structure or equivalent process transformation made by using the description and drawings of the present disclosure, or those directly or indirectly used in other related technical fields are also included in the patent protection scope of the present disclosure.

What is claimed is:

1. An image processing apparatus, comprising a memory and a processor, the memory configured to store instructions; wherein the processor is configured to execute the instructions to:
acquire brightness data of an image, the brightness data comprising brightness data of a color of each pixel in the image which represents an actual brightness of the color of each pixel in the image; and
store the brightness data of the color of each pixel in the image as N-bit grayscale data and store a brightness increase index of the color of the image, wherein the brightness increase index of the color of the image indicates a degree of increase in a brightness represented by the N-bit grayscale data of the color of each pixel in the image with respect to the actual brightness of the color of the pixel in the image, wherein the N-bit grayscale data is capable of representing M gray levels,
wherein the processor is configured to execute the instructions to store the brightness data of the color of each pixel in the image as N-bit grayscale data and store the brightness increase index of the color of the image by:
acquiring a maximum brightness Cx of the color of each pixel in the image;
determining a brightness interval corresponding to each of the M gray levels and the brightness increase index of the color of the image;
for each pixel, setting, based on the brightness interval to which the brightness data of the color of the pixel belongs, the N-bit grayscale data of the pixel as N-bit grayscale data corresponding to the gray level corresponding to the brightness interval, and storing the N-bit grayscale data of the pixel; and
storing the brightness increase index of the color of the image, and
wherein determining the brightness interval corresponding to each of the M gray levels and the brightness increase index of the color of the image comprises:
when the maximum brightness Cx is greater than or equal to a preset brightness extreme value Cmax of the color, associating the highest one of the M gray levels with a range of brightness greater than or equal to the preset brightness extreme value Cmax, dividing a range of brightness from 0 to the preset brightness extreme value Cmax of the color into M-1 intervals, associating each of the M-1 gray levels below the highest gray level in an ascending order of level with one of M-1 intervals in an ascending order of brightness, and determining the brightness increase index of the color of the image based on the preset brightness extreme value Cmax of the color; and
when the maximum brightness Cx is smaller than the preset brightness extreme value Cmax of the color, associating the highest one of the M gray levels with a preset brightness Cy of the color, dividing a range of brightness from 0 to the preset brightness Cy of the color into M-1 intervals, associating each of the M-1 gray levels below the highest gray level in an ascending order of level with one of the M-1 intervals in an ascending order of brightness, where Cx<=Cy <Cmax, and determining the brightness increase index of the color of the image based on the preset brightness Cy of the color or based on the preset brightness Cy of the color and the preset brightness extreme value Cmax of the color.

2. The image processing apparatus according to claim 1, wherein when the maximum brightness Cx is greater than or equal to the preset brightness extreme value Cmax, the brightness intervals associated with the M gray levels in the ascending order are [0, Cmax*1/M-1), [Cmax*1/M-1, Cmax*2/M-1), [Cmax*2/M-1, Cmax*3/M-1), ..., [Cmax*(j-1)/M-1, Cmax*j/M-1), ..., [Cmax*(M-2)/M-1, Cmax), and [Cmax, Cmax], respectively, where j is a natural number greater than or equal to 1 and smaller than or equal to M-1; and
when the maximum brightness Cx is smaller than the preset brightness extreme value Cmax, the brightness intervals associated with the M gray levels in the ascending order are [0, Cy*1/M-1), [Cy*1/M-1, Cy*2/M-1), [Cy*2/M-1, Cy*3/M-1), ..., [Cy*(j-1)/M-1, Cy*j/M-1), ..., [Cy*(M-2)/M-1, Cy), and [Cy, Cy], respectively.

3. The image processing apparatus according to claim 1, wherein the brightness data of the color of each pixel in the image comprises brightness data of at least two colors, the color comprises the at least two colors, the processor is configured to execute the instructions to store the brightness data of each color of each pixel in the image as N-bit grayscale data and store the brightness increase index of each color of the image, the N-bit grayscale data stored in the brightness data of each color of each pixel in the image constitutes image data corresponding to the color, and the image data of all colors as stored for the image constitutes data of one frame of image.

4. The image processing apparatus according to claim 1, wherein Cy=Cx.

5. The image processing apparatus according to claim 1, wherein the brightness increase index indicates a degree of increase in the preset brightness extreme value Cmax of the color or the preset brightness Cy of the color with respect to the maximum brightness Cx of the color, and wherein when the maximum brightness Cx is greater than or equal to the preset brightness extreme value Cmax, the degree indicated by the brightness increase index of the color is 0, and when the maximum brightness Cx is smaller than the preset brightness extreme value Cmax, the brightness increase index of the color is equal to (Cy-Cx)/Cx.

6. The image processing apparatus according to claim 1, wherein the brightness increase index indicates a degree of increase in the preset brightness extreme value Cmax of the color or the preset brightness Cy of the color with respect to the maximum brightness Cx of the color, and wherein when the maximum brightness Cx is greater than or equal to the preset brightness extreme value Cmax, the degree indicated by the brightness increase index of the color is 1, and when the maximum brightness Cx is smaller than the preset brightness extreme value Cmax, the brightness increase index of the color is equal to Cy/Cx.

7. An image processing method, comprising steps of:
acquiring brightness data of an image, the brightness data comprising brightness data of a color of each pixel in the image, which represents an actual brightness of the color of each pixel in the image; and
storing the brightness data of the color of each pixel in the image as N-bit grayscale data and store a brightness increase index of the color of the image, wherein the brightness increase index of the color of the image indicates a degree of increase in a brightness represented by the N-bit grayscale data of the color of each pixel in the image with respect to the actual brightness of the color of the pixel in the image, wherein the N-bit grayscale data is capable of representing M gray levels, wherein said storing the brightness data of the color of each pixel in the image as N-bit grayscale data and storing the brightness increase index of the color of the image comprise:

acquiring a maximum brightness Cx of the color of each pixel in the image;

determining a brightness interval corresponding to each of the M gray levels and the brightness increase index of the color of the image;

for each pixel, setting, based on the brightness interval to which the brightness data of the color of the pixel belongs, the N-bit grayscale data of the pixel as N-bit grayscale data corresponding to the gray level corresponding to the brightness interval, and storing the N-bit grayscale data of the pixel; and storing the brightness increase index of the color in the image, wherein determining the brightness interval corresponding to each of the M gray levels and the brightness increase index of the color of the image comprises:

when the maximum brightness Cx is greater than or equal to a preset brightness extreme value Cmax of the color, associating the highest one of the M gray levels with a range of brightness greater than or equal to the preset brightness extreme value Cmax, dividing a range of brightness from 0 to the preset brightness extreme value Cmax of the color into M-1 intervals, associating each of the M-1 gray levels below the highest gray level in an ascending order of level with one of M-1 intervals in an ascending order of brightness, and determining the brightness increase index of the color of the image based on the preset brightness extreme value Cmax of the color; and when the maximum brightness Cx is smaller than the preset brightness extreme value Cmax of the color, associating the highest gray level of the M gray levels with a preset brightness Cy of the color, dividing a range of brightness from 0 to the preset brightness Cy of the color into M-1 intervals, associating each of the M-1 gray levels below the highest gray level in an ascending order of level with one of the M-1 intervals in an ascending order of brightness, where Cx<=Cy<Cmax, and determining the brightness increase index of the color of the image based on the preset brightness Cy of the color or based on the preset brightness Cy of the color and the preset brightness extreme value Cmax of the color.

8. A display apparatus, comprising:

a memory and a processor, the memory configured to store instructions; wherein the processor is configured to execute the instructions to:

acquire image data of an image, wherein the image data of the image comprises image data of a color and a brightness increase index of the color, the image data of the color comprises N-bit grayscale data representing a brightness corresponding to the color of each pixel in the image, and the brightness increase index of the color of the image indicates a degree of increase in the brightness represented by the N-bit grayscale data of the color of each pixel in the image with respect to an actual brightness of the color of the pixel in the image;

light emitting device, wherein the light emitting device is configured to emit illumination light of the color, and adjusts a brightness of the illumination light based on the brightness increase index of the color of the image; and an image modulator, wherein the image modulator is configured to modulate the illumination light of the color based on the N-bit grayscale data of the image data of the color, to generate image light required for displaying the image, wherein when the brightness increase index of the color of the image indicates that the brightness represented by the N-bit grayscale data of the color of each pixel in the image is not increased with respect to the actual brightness of the color of the pixel in the image, the light-emitting device is configured to adjust the brightness of the emitted illumination light of the color to a preset standard brightness Lo of the color based on the brightness increase index of the color, and when the brightness increase index of the color of the image indicates that the brightness represented by the N-bit grayscale data of the color of each pixel in the image is increased with respect to the actual brightness of the color of the pixel in the image, the light-emitting device is configured to adjust the brightness of light of the color in the emitted illumination light to Lt based on the brightness increase index of the color, the brightness Lt being smaller than the preset standard brightness Lo.

9. The display apparatus according to claim 8, wherein when the brightness represented by the N-bit grayscale data of the color of each pixel in the image is not increased with respect to the actual brightness of the color of the pixel in the image, the light-emitting device is configured to lower, in relation to the preset standard brightness Lo, the brightness of the light of the color in the illumination light inverse-proportionally based on the degree represented by the brightness increase index.

10. The display apparatus according to claim 8, wherein the brightness increase index of the color of the image indicates the degree of increase in a brightness represented by a maximum gray level of the N-bit grayscale data of the color of each pixel in the image with respect to a maximum brightness of actual brightness of the color of all pixels in the image.

11. The display apparatus according to claim 10, wherein the brightness increase index of the color of the image is: a ratio of the brightness represented by the maximum gray level of the N-bit grayscale data of the color of each pixel in the image to the maximum brightness of the actual brightness of the color of all pixels in the image, or a ratio of a difference between the brightness represented by the maximum gray level of the N-bit grayscale data of the color of each pixel in the image and the maximum brightness of the actual brightness of the color of all pixels in the image to the maximum brightness of the actual brightness of the color of all pixels in the image.

12. The display apparatus according to claim 8, wherein the processor is configured to execute the instructions to receive image data of the image, the image data of the image comprises image data and brightness increase indices of the at least two colors, the image data of each color comprises N-bit grayscale data representing the brightness corresponding to the color of each pixel in the image, the illumination light emitted by the light-emitting device comprises light of the at least two colors, the light-emitting device is configured to adjust a brightness of light of each color in the illumination light based on the brightness increase index of the color of the image, and the image modulator is configured to modulate, based on the N-bit grayscale data of the image data of each color, the illumination light of the color to generate image light required for displaying the image.

13. The display apparatus according to claim 12, wherein the light-emitting device is configured to sequentially emit light of each color, and the image modulator is configured to sequentially modulate the light of each color based on the N-bit grayscale data of the image data of the color.

14. The display apparatus according to claim 13, wherein the light-emitting device comprises a light source, a color wheel, and a light source controller, and wherein the light source is configured to emit excitation light, the color wheel is located in a light path of the excitation light emitted by the light source and is configured to receive the excitation light and sequentially emit the light of each color, and the light source controller is configured to control a brightness of the excitation light emitted by the light source based on the brightness increase index of each color of the image, so as to control the brightness of the light of each color emitted by the light-emitting device.

15. The display apparatus according to claim 12, wherein the light-emitting device comprises color light sources each corresponding to light of one of the colors and a light source controller, and the light source controller is configured to adjust a brightness of light of the color emitted by each of the color light sources based on the brightness increase index of the color of the image.

16. The display apparatus according to claim 8, wherein the processor is configured to execute the instructions to receive image data of the image, the image data of the image comprises image data of at least two colors and brightness increase indices of the at least two colors, the image data of each color comprises a plurality of pieces of N-bit grayscale data, the illumination light emitted by the light-emitting device comprises mixed chromatic light of the at least two colors, the light-emitting device is configured to adjust a brightness of the mixed chromatic light based on a smaller one of the brightness increase indices corresponding to the at least two colors in such a manner that when the brightness represented by the N-bit grayscale data of the color of each pixel in the image is increased with respect to the actual brightness of the color of the pixel in the image, a brightness of light of the color emitted by the light-emitting device is smaller than the preset standard brightness of the light of the color.

17. The display apparatus according to claim 16, wherein the light-emitting device comprises a light source, a color wheel, and a light source controller, and wherein the light source is configured to emit excitation light, the color wheel comprises at least two segmented regions, and the two segmented regions are periodically located in a light path of the excitation light in a time division manner, a first segmented region is configured to receive the excitation light and emit the excitation light as light of one color, a second segmented region has a fluorescent material and is configured to receive the excitation light and generate fluorescence as the mixed chromatic light, and the light source controller is configured to control the brightness of the excitation light emitted by the light source based on one of the brightness increase indices of the at least two colors, so as to control the brightness of the mixed chromatic light emitted by the light-emitting device.

18. The display apparatus according to claim 16, wherein the light-emitting device further comprises a light source, a color wheel, a light source controller, a scattering-reflecting sheet, a light-splitting sheet, and a light-homogenizing device, and wherein the light-splitting sheet comprises a first region and a second region, the light source is configured to emit excitation light, a part of the excitation light is irradiated to the first region, and the first region is configured to guide the part of the excitation light to the scattering-reflecting sheet, the scattering-reflecting sheet is configured to scatter and reflect the part of the excitation light to the light-splitting sheet, the second region of the light-splitting sheet is configured to guide the part of the excitation light to the light-homogenizing device, the light-homogenizing device is configured to homogenize and emit the part of the excitation light as light of one color; another part of the excitation light is irradiated to the second region, and the second region is configured to guide the other part of the excitation light to the color wheel, the color wheel has a fluorescent material is disposed thereon, and the fluorescent material is configured to receive the other part of the excitation light and generate fluorescence as the mixed chromatic light, the color wheel is configured to guide the mixed chromatic light to the light-splitting sheet, the light-splitting sheet is configured to guide the mixed chromatic light to the light-homogenizing device, and the light-homogenizing device is configured to homogenize and emit the mixed chromatic light.

19. The display apparatus according to claim 18, wherein the light-emitting device further comprises a supplemental light source, and wherein the supplemental light source is configured to emit supplemental light, the supplemental light is also guided to the image modulator, the supplemental light includes light of one color in the mixed chromatic light, and the light source controller is configured to control a brightness of the supplemental light emitted by the supplemental light source based on a smaller one of the brightness increase indices corresponding to the at least two colors.

20. The display apparatus according to claim 19, wherein the light-emitting device further comprises a dichroic film, and wherein the dichroic film is disposed between the light-splitting sheet and the light-homogenizing device, the supplemental light source is configured to emit the supplemental light to the dichroic film, the dichroic film is configured to reflect the supplemental light to the light-homogenizing device, and the part of the excitation light and at least part of the mixed chromatic light are further transmitted through the dichroic film and then guided to the light-homogenizing device.

21. A display method, comprising steps of:
acquiring image data of an image, wherein the image data of the image comprises image data of a color and a brightness increase index of the color, the image data of the color comprises N-bit grayscale data representing a brightness corresponding to the color of each pixel in the image, and the brightness increase index of the color of the image indicates a degree of increase in the brightness represented by the N-bit grayscale data of the color of each pixel in the image with respect to an actual brightness of the color of the pixel in the image;
providing illumination light of the color, and adjusting a brightness of the illumination light based on the brightness increase index of the color of the image; and
modulating the illumination light of the color based on the N-bit grayscale data of the image data of the color, to generate image light required for displaying the image,
wherein when the brightness increase index of the color of the image indicates that the brightness represented by the N-bit grayscale data of the color of each pixel in the image is not increased with respect to the actual brightness of the color of the pixel in the image, the light-emitting device adjusts the brightness of the emitted illumination light of the color to a preset standard brightness Lo of the color based on the brightness increase index of the color, and when the brightness increase index of the color of the image indicates that the brightness represented by the N-bit grayscale data of the color of each pixel in the image is increased with respect to the actual brightness of the color of the pixel in the image, the light-emitting device adjusts the brightness of light of the color in the emitted illumination light to Lt based on the brightness increase index of the color, and the brightness Lt is smaller than the preset standard brightness Lo.

22. An image processing and display apparatus, comprising a light-emitting device, an image modulator, a memory, and a processor, the memory configured to store instructions; wherein the processor is configured to execute the instructions to:
    acquire brightness data of an image, the brightness data comprising brightness data of a color of each pixel in the image, which represents an actual brightness of the color of each pixel in the image; and
    store the brightness data of the color of each pixel in the image as N-bit grayscale data and store a brightness increase index of the color of the image, wherein the brightness increase index of the color of the image indicates a degree of increase in a brightness represented by the N-bit grayscale data of the color of each pixel in the image with respect to the actual brightness of the color of the pixel in the image, wherein the N-bit grayscale data is capable of representing M gray levels,
    wherein the processor is configured to execute the instructions to store the brightness data of the color of each pixel in the image as N-bit grayscale data and store the brightness increase index of the color of the image by:
    acquiring a maximum brightness Cx of the color of each pixel in the image;
    determining a brightness interval corresponding to each of the M gray levels and the brightness increase index of the color of the image;
    for each pixel, setting, based on the brightness interval to which the brightness data of the color of the pixel belongs, the N-bit grayscale data of the pixel as N-bit grayscale data corresponding to the gray level corresponding to the brightness interval, and storing the N-bit grayscale data of the pixel; and
    storing the brightness increase index of the color of the image,
    wherein said determining the brightness interval corresponding to each of the M gray levels and the brightness increase index of the color of the image comprises:
    when the maximum brightness Cx is greater than or equal to a preset brightness extreme value Cmax of the color, associating the highest one of the M gray levels with a range of brightness greater than or equal to the preset brightness extreme value Cmax, dividing a range of brightness from 0 to the preset brightness extreme value Cmax of the color into M-1 intervals, associating each of the M-1 gray levels below the highest gray level in an ascending order of level with one of M-1 intervals in an ascending order of brightness, and determining the brightness increase index of the color of the image based on the preset brightness extreme value Cmax of the color; and
    when the maximum brightness Cx is smaller than the preset brightness extreme value Cmax of the color, associating the highest one of the M gray levels with a preset brightness Cy of the color, dividing a range of brightness from 0 to the preset brightness Cy of the color into M-1 intervals, associating each of the M-1 gray levels below the highest gray level in an ascending order of level with one of the M-1 intervals in an ascending order of brightness, where Cx<=Cy<Cmax, and determining the brightness increase index of the color of the image based on the preset brightness Cy of the color or based on the preset brightness Cy of the color and the preset brightness extreme value Cmax of the color,
    the processor configured to execute the instructions to acquire the N-bit grayscale data stored in the brightness data of the color of each pixel in the image and the brightness increase index of the color of the image,
    the light-emitting device configured to emit illumination light of the color, and the light-emitting device adjusts the brightness of the illumination light based on the brightness increase index of the color of the image,
    the image modulator configured to modulate the illumination light of the color based on the N-bit grayscale data of the image data of the color, to generate image light required for displaying the image,
    wherein when the brightness increase index of the color of the image indicates that the brightness represented by the N-bit grayscale data of the color of each pixel in the image is not increased with respect to the actual brightness of the color of the pixel in the image, the light-emitting device is configured to adjust the brightness of the emitted illumination light of the color to a preset standard brightness Lo of the color based on the brightness increase index of the color, and
    when the brightness increase index of the color of the image indicates that the brightness represented by the N-bit grayscale data of the color of each pixel in the image is increased with respect to the actual brightness of the color of the pixel in the image, the light-emitting device is configured to adjust the brightness of light of the color in the emitted illumination light to Lt based on the brightness increase index of the color, the brightness Lt being smaller than the preset standard brightness Lo.

23. An image processing and display method, comprising steps of:
    acquiring brightness data of an image, the brightness data comprising brightness data of a color of each pixel in the image, which represents an actual brightness of the color of each pixel in the image;
    storing the brightness data of the color of each pixel in the image as N-bit grayscale data and storing a brightness increase index of the color of the image, wherein the brightness increase index of the color of the image indicates a degree of increase in a brightness represented by the N-bit grayscale data of the color of each pixel in the image with respect to the actual brightness of the color of the pixel in the image, wherein the N-bit grayscale data is capable of representing M gray levels,
    wherein said storing the brightness data of the color of each pixel in the image as N-bit grayscale data and storing the brightness increase index of the color of the image comprise:
    acquiring a maximum brightness Cx of the color of each pixel in the image;
    determining a brightness interval corresponding to each of the M gray levels and the brightness increase index of the color of the image;
    for each pixel, setting, based on the brightness interval to which the brightness data of the color of the pixel belongs, the N-bit grayscale data of the pixel as N-bit grayscale data corresponding to the gray level corresponding to the brightness interval, and storing the N-bit grayscale data of the pixel; and storing the brightness increase index of the color of the image, wherein determining the brightness interval corresponding to each of the M gray levels and the brightness increase index of the color of the image comprises:

when the maximum brightness Cx is greater than or equal to a preset brightness extreme value Cmax of the color, associating the highest one of the M gray levels with a range of brightness greater than or equal to the preset brightness extreme value Cmax, dividing a range of brightness from 0 to the preset brightness extreme value Cmax of the color into M-1 intervals, associating each of the M-1 gray levels below the highest gray level in an ascending order of level with one of M-1 intervals in an ascending order of brightness, and determining the brightness increase index of the color of the image based on the preset brightness extreme value Cmax of the color;

when the maximum brightness Cx is smaller than the preset brightness extreme value Cmax of the color, associating the highest one of the M gray levels with a preset brightness Cy of the color, dividing a range of brightness from 0 to the preset brightness Cy of the color into M-1 intervals, associating each of the M-1 gray levels below the highest gray level in an ascending order of level with one of the M-1 intervals in an ascending order of brightness, where Cx<=Cy <Cmax, and determining the brightness increase index of the color of the image based on the preset brightness Cy of the color or based on the preset brightness Cy of the color and the preset brightness extreme value Cmax of the color;

acquiring the N-bit grayscale data stored by the brightness data of the color of each pixel in the image and the brightness increase index of the color of the image;

providing illumination light of the color, and adjusting a brightness of the illumination light based on the brightness increase index of the color of the image; and modulating the illumination light of the color based on the N-bit grayscale data of the image data of the color, to generate image light required for displaying the image, wherein when the brightness increase index of the color of the image indicates that the brightness represented by the N-bit grayscale data of the color of each pixel in the image is not increased with respect to the actual brightness of the color of the pixel in the image, the brightness of the emitted illumination light of the color is adjusted to a preset standard brightness Lo of the color based on the brightness increase index of the color, and when the brightness increase index of the color of the image indicates that the brightness represented by the N-bit grayscale data of the color of each pixel in the image is increased with respect to the actual brightness of the color of the pixel in the image, the brightness of light of the color in the emitted illumination light is adjusted to Lt based on the brightness increase index of the color, the brightness Lt being smaller than the preset standard brightness Lo.

* * * * *